United States Patent [19]
Polyak et al.

[11] Patent Number: 5,014,315
[45] Date of Patent: May 7, 1991

[54] DIGITAL TELEPHONE SYSTEM

[76] Inventors: Mark U. Polyak, Naberezhnaya M. Gorkogo, 32/34, kv. 66; Gely P. Abugov, ulitsa Kosinskaya, 26, Korpus 2, kv. 116; Vladimir B. Belyak, prospekt Mira, 11, kv. 48, all of Moscow, U.S.S.R.

[21] Appl. No.: 381,774

[22] Filed: Jul. 18, 1989

[30] Foreign Application Priority Data

Jul. 20, 1988 [SU] U.S.S.R. ................ 4449343

[51] Int. Cl.$^5$ .................... H04M 3/00; H04L 9/00
[52] U.S. Cl. ........................... 380/49; 380/9; 370/56; 379/93; 379/94; 379/97; 379/98; 379/334
[58] Field of Search ............ 380/9, 28, 49, 50, 21, 380/38, 47, 48; 370/29, 56; 379/93, 94, 97, 98, 334

[56] References Cited

U.S. PATENT DOCUMENTS

| | | | |
|---|---|---|---|
| 3,941,947 | 3/1976 | Jacob et al. | 370/56 |
| 4,201,889 | 5/1980 | Lawrence et al. | 370/68 |
| 4,327,436 | 4/1982 | Ohara et al. | 370/56 X |
| 4,357,701 | 11/1982 | Canniff | 370/56 X |
| 4,571,721 | 2/1986 | Yasui et al. | 370/56 |

FOREIGN PATENT DOCUMENTS 198389 6/1967 U.S.S.R.
2021901 12/1979 United Kingdom.

OTHER PUBLICATIONS

Siemens, Digital Electronic Switching System EWSD, 1987, (In Russian).
Telenokia, The DX=200 Electronic ATX, 1985, Finland, (In Russian).

Primary Examiner—Stephen C. Buczinski
Assistant Examiner—Bernarr Earl Gregory
Attorney, Agent, or Firm—Lilling & Lilling

[57] ABSTRACT

A digital telephone system, having a through-switching module connected by its inputs/outputs to "1" subscriber concentration modules, each with group subscriber inputs/outputs connected via remote subscriber modules to groups of telephone sets. The telephone sets are digital telephone sets with inputs/outputs connected to individual subscriber inputs/outputs of remote subscriber modules via digital individual subscriber lines to provide transmission and reception of digitally coded information.

9 Claims, 9 Drawing Sheets

DIGITAL TELEPHONE SYSTEM

BACKGROUND OF THE INVENTION

1. Field of the Invention

The invention relates to the field of telecommunications technology, and specifically to digital telephony.

The invention can be used as an automatic branch exchange (PABX) in digital telephone networks.

2. Description of the Related Art

The new generation of switching facilities based on the use of digital transmission and switching methods is designed to improve the flexibility and cost-efficiency of telecommunication systems, reduce maintenance costs and labor comsumption, simplify manufacture, and enlarge the scope of services provided to subscribers. Currently, known in the art are a series of program-controlled electronic exchanges for switching digitized telephone signals (Siemens, Digital Electronic Switching System EWSD, 1987; GB, B, 2.021.901; U.S. Pat. No. 4,201,889).

These electronic automatic branch exchanges (EPABX) comprise a through-switching module with a group switching stage and units for interchange of telephone information and handshaking signals with other PABXs in the telephone network, and several subscriber concentration modules comprising analogue-to-digital and digital-to-analogue converters, a subscriber switching stage for digitized telephone signal switching, subscriber telephone sets for voice communication with other telephone sets and for handshaking via physical individual telephone lines, and transmit/receive units for interchange of information and signaling data between through-switching modules and subscriber concentration modules. The EPABX can be controlled from a host computer, but a more common practice is to provide control at the level of through-switching and subscriber concentration modules.

To reduce the overall length of cables to individual subscribers in some exchanges the entire subscriber concentration module or part of its equipment is remote to the EPABX and designed as remote digital concentrators linked to the EPABX via digital group communication lines. Some PABXs are equipped with special devices linking the subscriber's terminal to an individual digital communication line and thus widening the functional capabilities of this subscriber.

The common drawback of these known in the art digital PABXs is the relatively high cost of equipment, which is considerably higher than that of cross-bar systems. The inherent high cost of remote digital concentrators restricts the possible savings in cabling. Facilities linking digital data streams to a subscriber terminal are of sophisticated design due to the high transmission rate (192 Kbits per second), complexity of generating and separating digital data streams and difficulty of two-way transmitting them via pair telecommunications lines, resulting in their being affordable to a limited number of telephone networks subscribers.

In the description of this invention the term "digital telephone system" is used to designate a system comprising digital switching equipment and a number of telephone sets linked to it.

Known in the art is a digital telephone system (Telenokia, The DX=200 Electrontic ATX, 1985, Finland), wherein several Dx210 EPABXs are used as subscriber concentration modules linked to a DX=200 through-switching exchange used as the through-switching module.

This known in the art digital telephone system comprises a through-switching module with a group switching stage, connected to groups of terminal exchange sets designed to interface to subscriber concentration modules of this system and to other PABXs, a common signaling channel unit, line and multifrequency signaling units being connected to the group switching level. The through-switching module also comprises a control device (marker) connected via a control signal exchange bus to the group switching stage and to the common signaling channel and line signaling units. This known in the art digital switching system also comprises several subscriber concentration modules designed to concentrate subscriber channels, with each such module linked via its group input/outputs and intermediate group communications lines to the inputs/outputs of the through-switching module, namely to one of the groups of terminal exchange sets of the through-switching module. Each subscriber concentration module includes a subscriber switching stage connected by its inputs/outputs to groups of terminal exchange sets, to a group of subscriber modules designed to interface to telephone sets, to a handshaking signal generator, and to a common signaling channel unit. Each subscriber concentration module also comprises a control device (call processing unit) connected to the subscriber switching level and to the common signaling channel unit.

This known in the art digital telephone system also comprises remote subscriber modules with group subscriber inputs/outputs connected to one terminal exchange set of the subscriber concentration module. Each such remote subscriber module comprises a regenerator, a cycle synchronization signal receiver, and a pulse sequence generator, and also a cycle generator, group analogue-to-digital converters (ADC's) and digital-to-analogue converters (DACs), a concentrator multiplexing sixty four subscriber channels into a stream of samples from thirty channels, a switch routing the samples of thirty channels to sixty four subscriber channels, a processor, and sixty four subscriber sets each comprising a switching set, a differential balanced-loop system, a supply bridge, a signal amplifier, and a switching set control circuitry with appropriate links.

The remote subscriber module also comprises a call signal generator, a test signal generator, and a local power supply connected via the supply bridge to the differential system of each subscriber set. The subscriber module of the subscriber concentration module and the remote subscriber module provide communications between the subscriber concentration module and the telephone sets, these latter being of any type allowing transmission and reception of analogue signals and comprising a cradle switch, electroacoustic call signal transducer, earphone, microphone, dialing assembly, and electronic key connected to the input/output of the telephone set via a voltage regulator.

Outgoing communications are established by lifting the handset from the cradle, thus setting the cradle switch to its enabled state and causing current to flow from the remote subscriber module via a subscriber line. This current is detected by the switching set control circuitry, which generates an output signal indicating subscriber activity which is passed via a separate channel by the call processor to the call processor unit in the subscriber concentration module via its subscriber switching stage, this latter commanding the remote subscriber module processor to enable the readiness signal, indicating that the exchange is ready to accept the call. During dialing the electronic key breaks the supply circuit, thus causing generation of packets of currentless pulses, whose number in each packet corresponds to the digit being dialed.

The digits dialed are received by the call processor unit of the subscriber concentration module on arrival of a signal from the remote subscriber module processor.

On reception of the complete number being called, the call processor unit of the subscriber concentration module passes a signal to the control device (marker) in the through-switching module via the common signaling channel unit, the subscriber switching stage and terminal exchange sets of the subscriber concentration module, the terminal exchange sets of the through-switching module and the latter's group switching stage and common signaling channel unit. The through-switching module's marker controls handshaking between telephone exchanges and on completion of the handshaking procedure this marker and the subscriber contration module's call processor unit establish a connection between subscribers in the appropriate subscriber concentration module and through-switching module.

The voice signal from the microphone of the telephone set is passed in analogue form via the exchange set of the remote subscriber module and the subscriber line to the analogue-to-digital converter in the remote subscriber module and is included in digital form into the group signal transmitted via the group line and terminal exchange sets to the subscriber switching level in the subscriber concentration module, wherein the traffic is concentrated and the group signal is passed to the terminal exchange sets of the through-switching module.

In a similar way, the signal from the microphone of the called subscriber is passed via the through-switching module and digital intermediate group line to the subscriber concentration module, then to the remote subscriber module, wherein it is converted into an analogue signal in the digital-to-analogue converter and passed to an appropriate telephone set via the subscriber's set.

However, operation of this known in the art system is hampered by a number of factors.

First, due to the considerable spread in subscriber line lengths and spread in resistances the differential system of each remote subscriber module has to be balanced. The spread in subscriber line lengths also results in a spread of signal attenuation factors, thus necessitating a corresponding adjustment of the transfer factors in subscriber sets of remote subscriber modules. Both factors complicate the design of subscriber sets in remote subscriber modules.

Second place, in this system subscriber lines carry dialing and subscriber call signals of high amplitudes and therefore have to use switching sets with electromechanical and electronic keys. At the same time, speech signals are of considerably lower voltage amplitudes, so that the switching sets have to meet contradictory voltage specifications.

Third, remote subscriber modules perform digital-to-analogue signal conversion and vice versa for transmission via group subscriber lines, thus excluding the same group subscriber line being used to transmit the digital data stream directly to the telephone set and therefore complicating the use of digital subscriber equipment. This essentially restricts the functional capabilities of the digital telephone system.

Finally, considerable power consumption by the group analogue-to-digital and digital-to-analogue converters, and also in processors, analogue sets and traditional telephone sets, necessitates the use of local power supplies, thus resulting in greater dimensions of remote subscriber modules and requiring special space for its installation and thus hampering its use as a means of saving cabling.

The present invention is to provide a digital telephone system with the design configuration of remote subscriber modules allowing reception and transmission of speech signals, dialing signals, and call signals of a standard form, transmitted as a digital data stream, and with telephone exchange equipment of simpler design, to provide a wider scope of functional capabilities of the digital telephone system by connecting other types of subscriber digital equipment, and also to reduce the dimensions of the exchange equipment, the space required for its installation, and the length of communication lines, at the same time providing remote power supply to telephone sets and remote subscriber modules.

SUMMARY OF THE INVENTION

It is an objective of this invention to provide a wider scope of functional capabilities of a digital telephone system by carrying the information in digital form directly to the telephone set.

Another objective of the invention is to provide remote power supply by reducing the power consumption of telephone sets and remote subscriber modules.

Yet another objective of the invention is to reduce the dimensions of a remote subscriber module, and also to reduce the overall cabling length.

This is achieved by a digital telephone system, comprising a through-switching module with "p" information inputs/outputs thereof constituting the inputs/outputs of the digital telephone system, "1" subscriber concentration modules with the group intermediate inputs/outputs thereof connected to appropriate group intermediate inputs/outputs of the through-switching module, a plurality of remote subscriber modules with the group subscriber input/output of each connected to an appropriate group subscriber input/output of one of the subscriber concentration modules, and a plurality of telephone sets each connected to an appropriate subscriber concentration module. According to the invention all telephone sets are digital telephone sets with the inputs/outputs thereof intended to receive and transmit digitally coded information, the number of remote subscriber modules being equal to the number of telephone set groups with the inputs/outputs of individual telephone sets thereof connected to appropriate individual subscriber inputs/outputs of the corresponding remote subscriber module via individual subscriber digital lines designed to carry digitally coded information.

It is expedient that, in the digital telephone system according to the invention, each telephone set comprise an electroacoustic transducer, a microphone, an earphone, a dialing unit with keypad, a cradle switch, a voltage regulator and electronic key connected in series, and an univibrator connected to the output of the cradle switch. An interface unit with the line input/output thereof serves as the telephone set input/output and with the signal input thereof being connected to the output of the univibrator. A descrambler, with the input thereof connected to the signal output of the interface unit, is connected in series with a digital-to-analogue converter with the output thereof connected to the earphone input. An analogue-to-digital converter, with the data input thereof connected to the microphone output, connected in series with the scrambler. A call signal detector unit has one control input, a data input and an output connected, respectively, to the output of the cradle switch, signal output of the interface unit, and electroacoustic transducer input. A test signal decoder has a data input thereof connected to the signal output of the interface unit, with a control input thereof connected to the output of the cradle switch, and with the output thereof connected to the control input of the dialing assembly. An integrator has the input and output thereof connected, respectively, to the signal output of the interface unit and to the second control input of the call detector unit. A multiplexer has the data and control inputs thereof connected, respectively, to the scrambler output, dialing assembly output, integrator output, and cradle switch output, and the output thereof is connected to the signal input of the interface unit. The supply voltage output of the interface unit is connected via the voltage regulator and electronic key to the supply voltage inputs of the analogue-to-digital and digital-to-analogue converters, wherein the control input of the electronic key is electrically connected to the output of the cradle switch.

It is highly efficient that, according to the invention, each remote subscriber module comprise, and connected in series, a regenerator, a cycle synchronization signal receiver and a pulse sequence generator. It would further comprise: a plurality of interface units equal in number to the number of individual inputs/outputs of the remote subscriber module, a multiplexer with the data inputs thereof connected to the data outputs of the interface units, a group signal statistical processing unit with the data input and output thereof connected, respectively, to the multiplexer output and the regenerator data input, a reverse signal processing unit with the data input thereof connected to the data output of the regenerator, and a demultiplexer with the data input thereof connected connected to the output of the reverse signal statistical processing unit and with the data outputs thereof connected to the data inputs of the interface unit, wherein the outputs of the pulse sequence generator are connected to the control inputs of the multiplexer, demultiplexer, group signal statistical processing unit and reverse signal statistical processing unit.

It is also highly advantageous that, according to the invention, each subscriber concentration module comprise a subscriber switching stage with one group of data inputs and outputs thereof connected to the appropriate outputs and inputs of a first group of terminal exchange sets, a common signaling channel unit, a second group of terminal exchange sets, a handshake signal generator, and a call processing unit with the inputs/outputs thereof connected via a control bus to the input/output of the common signaling channel unit and to the control output/input of the subscriber switching stage. It also would include a handshaking signals connection unit with the intermediate inputs and outputs thereof connected to the intermediate outputs and inputs of the subscriber switching stage and with the data inputs/outputs thereof connected to the data inputs/outputs of the second group of terminal exchange sets, a subscriber activity detection unit with the data inputs thereof connected to the data outputs of terminal exchange sets of the first group, and a subscriber signaling receiver with the data inputs thereof connected to the intermediate outputs of the subscriber switching stage, wherein the common signaling channel unit is electrically connected to the second group of terminal exchange sets and wherein the control inputs/outputs of the subscriber activity detector unit and the subscriber signaling receiver and the second control input/output of the handshaking signals connection unit are connected via the control bus to the control input/output of the call processing unit.

It is further advantageous that in the digital telephone system according to the invention each terminal exchange set of the second group in each subscriber concentration module would be equipped with a signal input/output connected to an appropriate signal input/output of the common signaling channel unit. In the through-switching module, one group of "p" terminal exchange sets with the inputs/outputs thereof constitutes the inputs/outputs of the digital telephone system, other groups of terminal exchange sets with some data inputs/outputs thereof constitute intermediate group inputs/outputs of the through-switching module, a group switching stage has data inputs/outputs thereof connected, respectively, to other data inputs/outputs of all the terminal exchange sets, and the first, second and third inputs/outputs of the group switching stage are connected, respectively, to the inputs/outputs of a multifrequency signaling unit, the common signaling channel unit and the line signaling unit. A control device is connected via the control bus to the control inputs of the common signaling channel unit, of the group switching stage and of the line signaling unit. Each terminal exchange set of the other groups in the throughswitching module are further complemented with signal input/output and the common signaling channel unit provided with additional signal inputs/outputs for connection to the signal inputs/outputs of terminal exchange sets of other groups.

It is also expedient that in the digital telephone system according to the invention each subscriber concentration module be further complemented with a remote power supply, each terminal exchange set of the first group be provided with a voltage input connected to an appropriate output of the remote power supply. Every remote subscriber module is complemented with a remote supply voltage transducer with the inputs thereof connected to the line input and output of the regenerator. Each interface unit is equipped with a voltage input connected to an appropriate output of the remote supply voltage transducer, and that each telephone set is complemented with an AND gate, with the two inputs and output thereof connected, respectively, to the output of the cradle switch, to the integrator output, and to the second input of the electronic key.

BRIEF DESCRIPTION OF ACCOMPANYING DRAWINGS

These and other objectives of the invention will become apparent from the following description of the invention and accompanying drawings, wherein.

DETAILED DESCRIPTION OF THE INVENTION

Figure 1:
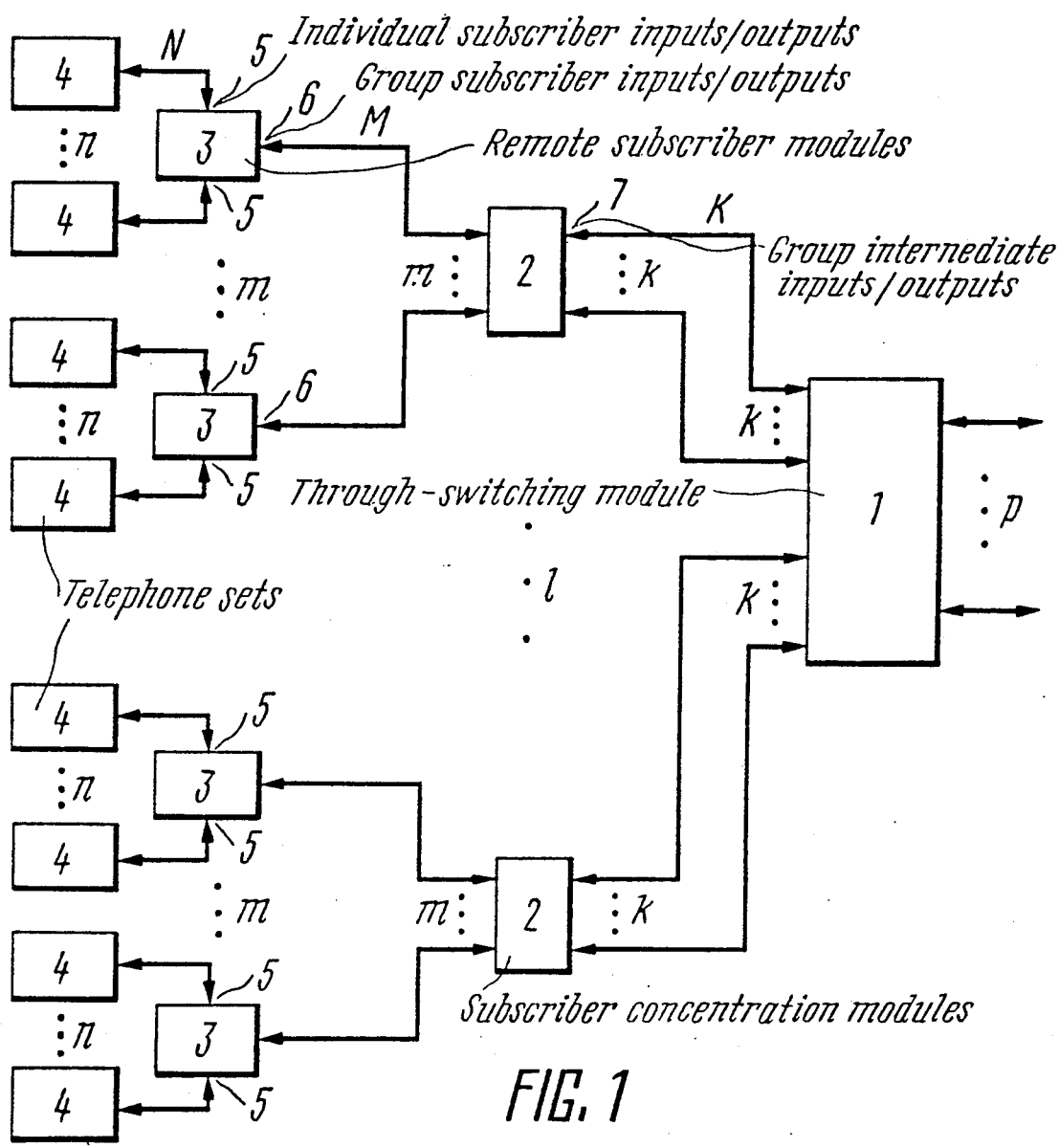
FIG. 1 shows a block or functional diagram of the digital telephone system according to the invention.

FIG. 1 illustrates the functional diagram of the digital telephone communications system according to this invention, comprising through-switching module 1 intended to establish communications between the digital telephone system and subscribers of other telephone exchanges or subscribers of its own automatic exchange.

The digital switching system comprises "l" subscriber concentration modules 2 intended to concentrate the traffic from subscriber equipment, a plurality of remote subscriber modules 3 whose number is a multiple of "l", e.g. "l m", intended to transmit data signals from subscriber concentration module 2 to and from the subscriber via "m" group subscriber lines "M", and groups of telephone sets 4, "n" telephone sets per group (obviously, the total number of telephone sets 4 is equal to "l×m×n"). Each of the "n" telephone sets in each group is connected by its input/output to one of the "n" individual inputs/outputs 5 of the corresponding remote subscriber module 3 via individual subscriber lines "N".

The group input/output 6 of each remote subscriber module 3 is connected to one of the "m" group subscriber inputs/outputs of a corresponding subscriber concentration module 2 via a group subscriber line "M". Each subscriber concentration module 2 is equipped with "k" group intermediate inputs/outputs 7. Throughswitching module 1 has "p" connection inputs/outputs constituting the inputs/outputs of the digital telephone system, and also "l" groups of "k" group intermediate inputs/outputs 7 in each, with each of the "k" group intermediate inputs/outputs 7 of each subscriber concentration module 2 connected to one of the "k" group intermediate inputs/outputs of one of the "l" groups in through-switching module 1 via a group intermediate connection line "K".

It should be stressed, that in the digital telephone system according to this invention connection of each telephone set 4 to its corresponding remote subscriber module 3 is acomplished via an individual subscriber line, which is a digital transmission line intended to carry digitally coded information, and each telephone set 4 is a digital telephone set interchanging digitally coded information with the telephone exchange. Each remote subscriber module 3 is intended to receive and transmit only digitally coded information arriving both at its group subscriber inputs/outputs 6 connected to subscriber concentration modules 2 and at individual subscriber inputs/outputs 5 connected to the inputs/outputs of telephone sets 4, which are digital telephone sets, as stated above.

Figure 2:
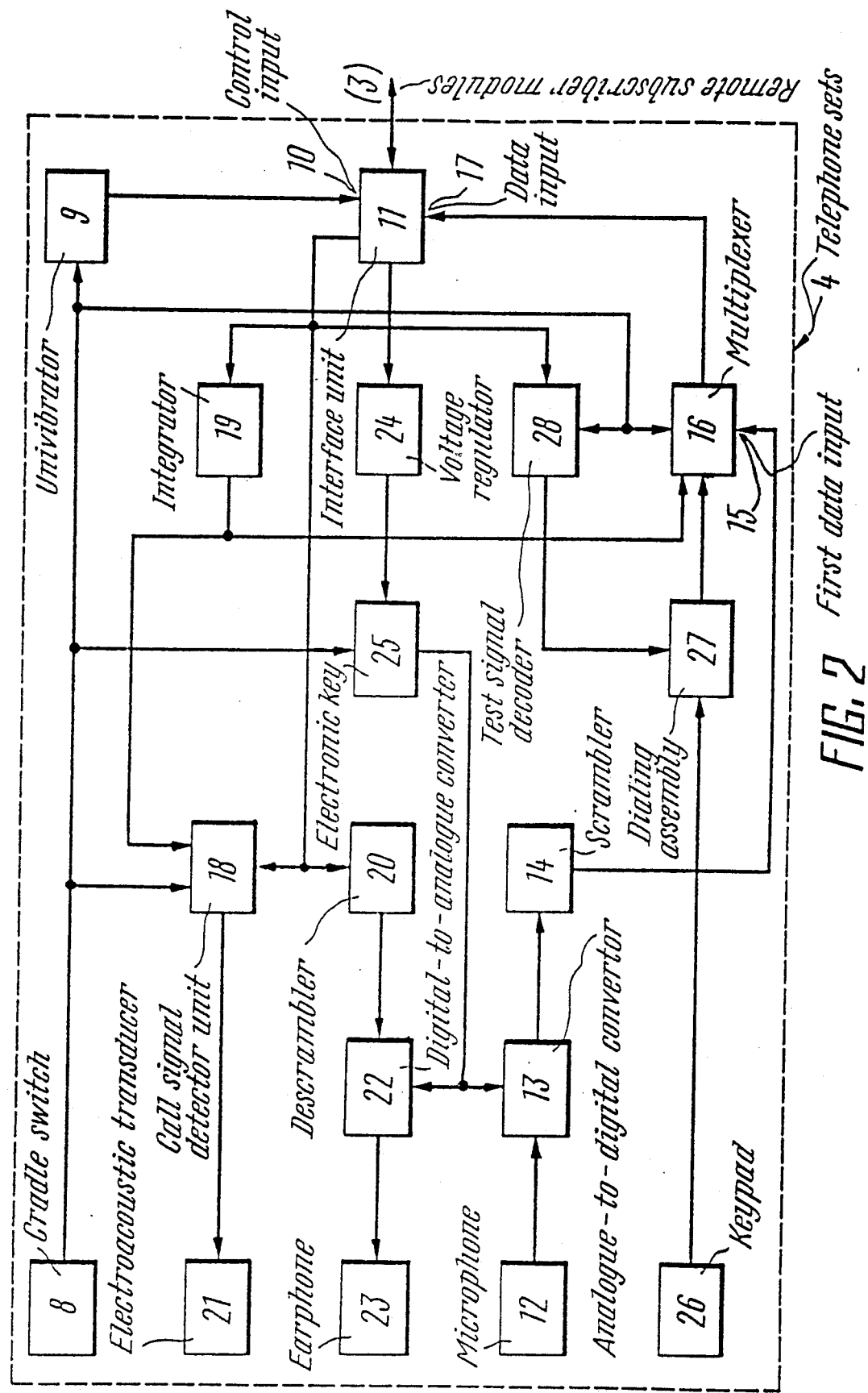
FIG. 2 shows a block diagram of an embodiment of a telephone set of the digital telephone system according to the invention.

An embodiment of such a telephone set 4 is shown in FIG. 2.

A telephone set 4 comprises cradle switch 8 and univibrator 9, connected in series, with the output of univibrator 9 connected to control input 10 of interface unit 11, the line input/output whereof constitutes the input/output of telephone set 4 and is connected to an individual subscriber input 5 (FIG. 1) of remote subscriber module 3. Telephone set 4 also comprises connected in series microphone 12, analogue-to-digital converter 13 and scrambler 14 with the output thereof connected to the first data input 15 of multiplexer 16. The output of multiplexer 16 is connected to the data input 17 of interface unit 11, the signal output whereof is connected to the data input of call signal detector unit 18, to the input of integrator 19, and to the input of descrambler 20. The output of call signal detector unit 18 is connected to the input of electroacoustic transducer 21. The output of descrambler 20 is connected to the data input of digital-to-analogue converter 22, the output whereof is connected to earphone 23. The output of remote supply voltage in interface unit 11 is connected via voltage regulator 24 to one input of electronic key 25, the control input whereof is driven from the output of cradle switch 8 and the output whereof is connected to the inputs of supply voltage of analogue-to-digital converter 13 and digital-to-analogue converter 22.

Telephone set 4 also comprises keypad 26 with the output thereof connected to one input of dialing assembly 27, the other input whereof is connected via test signal decoder 28 to the signal output of interface unit 11. The output of dialing assembly 27 is connected to the second data input of multiplexer 16, the first control input whereof is connected to the output of integrator 19 and to the second control input of call signal detector unit 18, the first control input whereof is connected to the output of cradle switch 8. The second control input of multiplexer 16 is connected to the control input of test signal decoder 28 and to the output of cradle switch 8.

Figure 3:
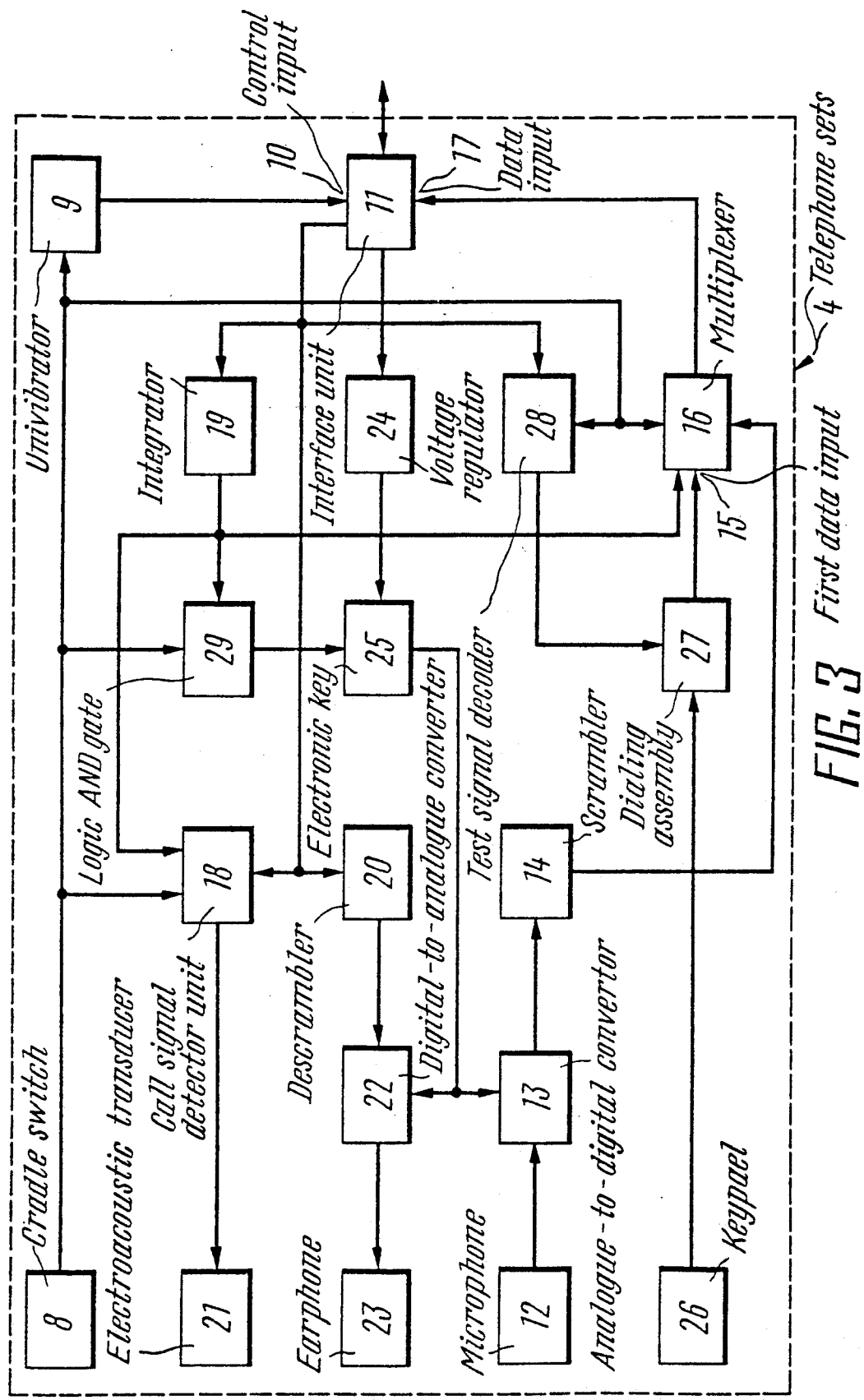
FIG. 3 shows a block diagram of another embodiment of the telephone set with an AND gate.

FIG. 3 shows a block diagram of another embodiment of telephone set 4, substantially similar to the embodiment shown in FIG. 2. The difference between these embodiments is that the control input of electronic key 25 (FIG. 3) is connected to the output of logic AND gate 29, the inputs whereof are connected, respectively, to the output of cradle switch 8 and to the output of integrator 19. Complementing the circuitry with a logic AND gate allows remote supply of telephone set 4, as will be demonstrated in detail below.

Figure 4:
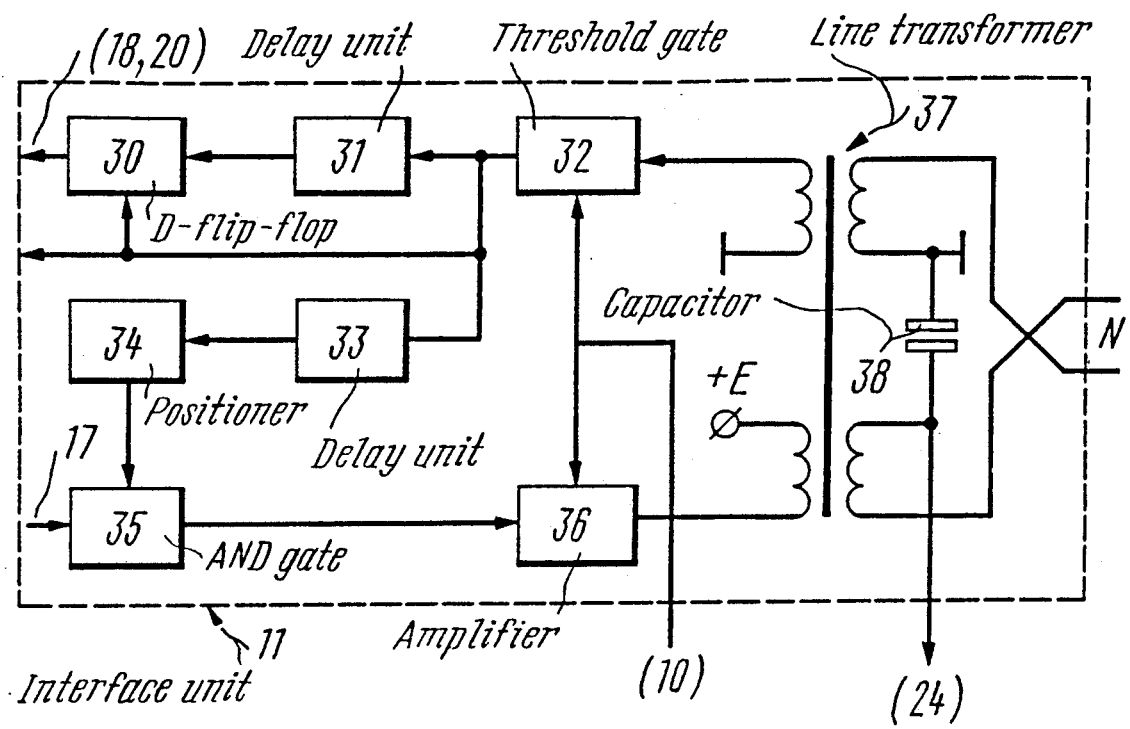
FIG. 4 shows a block diagram of an embodiment of the interface unit in the telephone set.

FIG. 4 shows the diagram of an embodiment of interface unit 11, comprising D-flip-flop 30 with the output thereof constituting the signal output of interface unit 11 and with one input thereof connected to the output of delay unit 31, the input whereof is driven from the output of threshold gate 32. The output of the threshold gate is also connected to the input of another delay unit 33 and to the clock input of D-flip-flop 30, and constituting the clock output of interface unit 11 used to drive the units in telephone set 4 with the clock frequency. This design configuration is widely known and is therefore not shown in the drawings. The output of delay unit 33 is connected via positioner 34, which is a device defining the position of the transmit signal of telephone set 4, to one input of AND gate 35, the other input whereof constitutes data input 17 of interface unit 11 and the output whereof is connected to amplifier 36. The input of threshold gate 32 and the output of amplifier 36 are connected to the windings of line transformer 37 used to connect interface unit 11 to an individual subscriber communication line "N".

The primary winding of transformer 37 is divided into two halfs with capacitor 38 providing a high-frequency connection between these halves and the voltage drop across it passed to voltage regulator 24 as the supply voltage. Threshold gate 32 is intended to separate the arriving positive pulses.

Dialing assembly 27 (FIG. 5) in telephone set 4 (FIG. 1) comprises divider 39 with the clock input thereof connected to threshold gate 32 in interface unit 11 (FIG. 4) and with the output thereof connected via AND gate 40 to one input of parallel-/serial register 41, the other inputs whereof are connected to the outputs of code converter 42. Code converter 42 processes the positioning code arriving from keypad 26, converting it into a four-bit code assigned to each key of the keypad. The outputs of code converter 42 drive the four inputs of OR gate 43. The outputs of divider 39, parallel/serial register 41 and OR gate 43 constitute the output of dialing assembly 27 to be passed to the data input 15 of multiplexer 16.

Telephone set 4 (FIG. 2) is a customized device and is not intended for use in other telephone networks; it cannot be replaced by a standard telephone set. Telephone set 4 comprises analogue-to-digital converter 13 (ADC) and digital-to-analogue converter 22 (DAC) directly connected to microphone 12 and earphone 23, respectively.

Microphone 12 can be of electrodynamic design and in this case is to be connected via a microphone amplifier.

Figure 6:
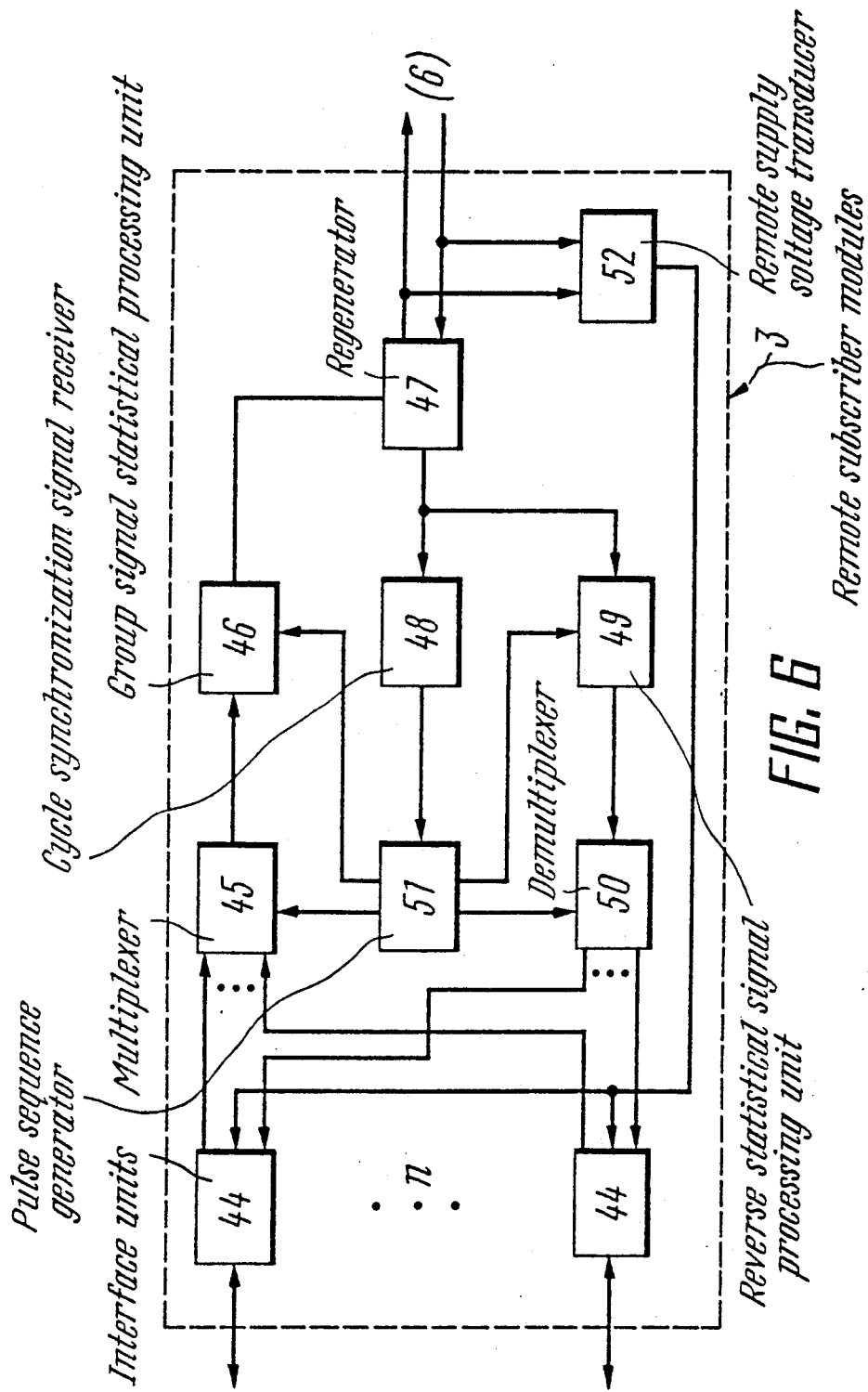
FIG. 6 shows a block diagram of a remote subscriber module according to the invention.

FIG. 6 shows a block diagram of remote subscriber module 3, comprising a plurality of interface units 44, one per each individual subscriber input/output 5, i.e. in this case "n" interface units 44, each connected to one of the "n" data inputs of multiplexer 45, the output whereof is connected to one of the inputs of group signal statistical processing unit 46 intended to produce an output signal with a more uniform spectrum and to insert the cycle synchronization signal, such processing being acomplished by known in the art techniques. The output of group signal statistical processing unit 46 is connected to the input of regenerator 47, the line input and output whereof constitute group subscriber input-/output 6 of remote subscriber module 3 and the data output whereof is connected to the input of cycle synchronization signal receiver 48 and to one input of reverse statistical signal processing unit 49 intended to separate the spectrum of the group data signal using known in the art techniques (SU,A, 198389); the cycle synchronization signals are transmitted with the group data signal. The output of unit 49 is connected to the input of demultiplexer 50, the "n" outputs whereof are connected to the data inputs of appropriate interface units 44. The output of cycle synchronization signal receiver 48 is connected to the input of pulse sequence generator 51, the outputs whereof are connected, respectively, to the control inputs of multiplexer 45, demultiplexer 50, group signal statistical processing unit 46, and reverse statistical processing unit 49.

With remote power supply, the circuitry of remote subscriber module 3 has to be complemented with remote supply voltage transducer 52 with the inputs thereof connected to the line input and output of regenerator 47 using a phantom circuit arrangement and with the output thereof connected to the voltage inputs of interface units 44.

Figure 7:
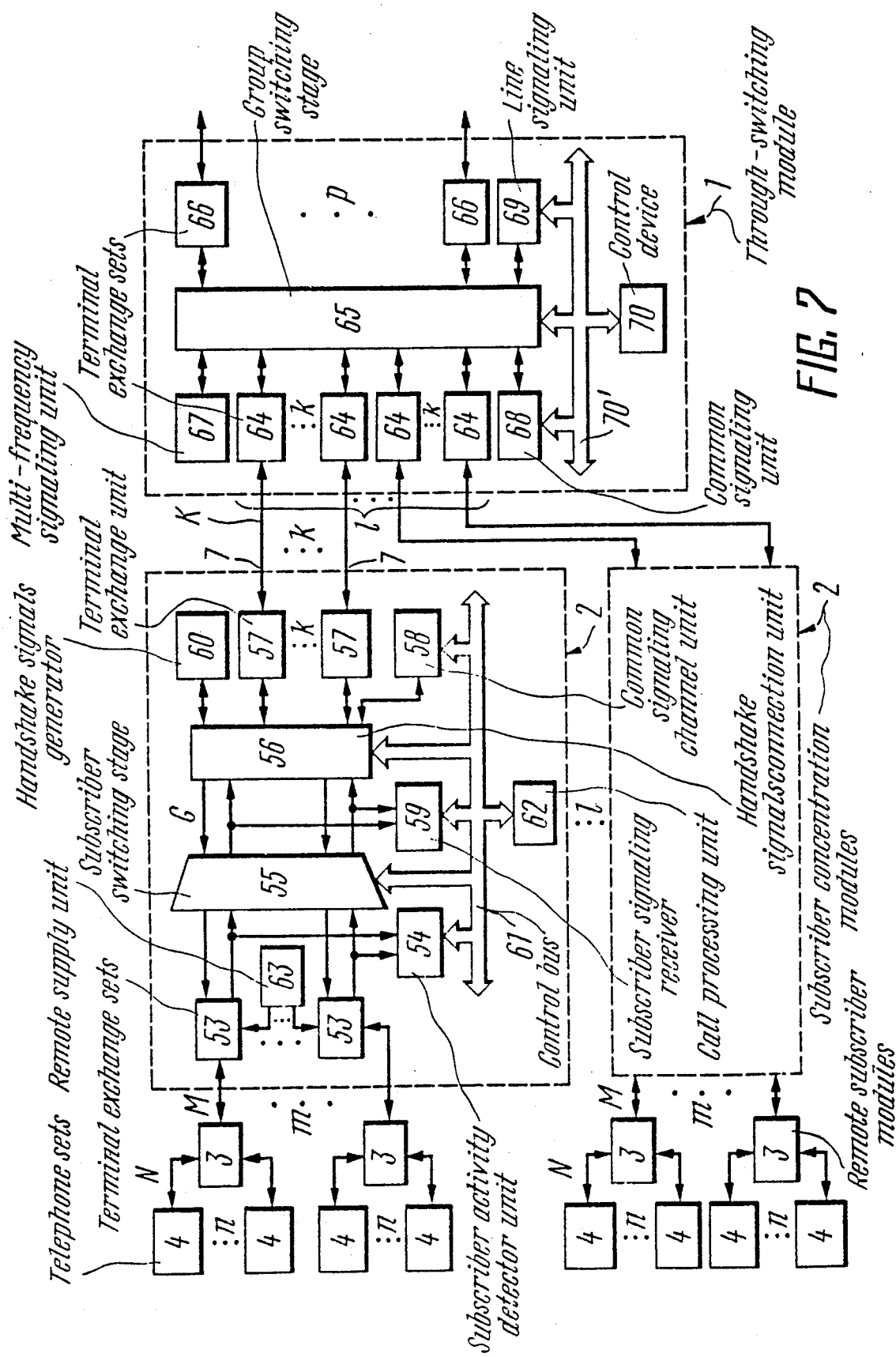
FIG. 7 shows a block diagram of an embodiment of the subscriber concentration module with the control signal arriving via the handshake signals connection unit.

FIG. 7 demonstrates the block diagram of an embodiment of a subscriber concentration module 2, comprising a first group of "m" terminal exchange sets 53 intended to provide signals interchange with remote subscriber modules 3. The data input/output of each terminal exchange set 53 constitutes a group subscriber input-/output of subscriber concentration module 2, with the other data outputs of terminal exchange sets 53 connected to the data inputs of a subscriber activity detector unit 54. Furthermore, the other data inputs/outputs of terminal exchange sets 53 of the first group are connected via the subscriber switching stage 55 to handshake signals connection unit 56, the data inputs/outputs whereof are connected to the data inputs/outputs of terminal exchange sets 57 of the second group intended for communications with through-switching module 1. Subscriber concentration module 2 also comprises common signaling channel unit 58, electrically connected to terminal exchange sets 57 of the second group, in the present case—via handshake signals connection unit 56. One of the inputs/outputs of common signalling channel unit 58 is connected to the control input/output of handshake signals connection unit 56. The intermediate outputs of subscriber switching stage 55 are connected to the inputs of subscriber signaling receiver 59, the handshake signal input of handshake signals connection unit 56 is connected to the output of handshake signals generator 60, and the intermediate outputs of handshake signals connection unit 56 are connected to the intermediate inputs of subscriber switching stage 55. The control inputs/outputs of subscriber activity detector unit 54, of subscriber signaling receiver 59, of subscriber switching stage 55, of handshake signals connection unit 56, and of common signaling channel unit 58 are connected to the input/output of call processing unit 62 via control bus 61.

With remote power supply of subscriber equipment, subscriber concentration module 2 has to be complemented with a remote supply unit 63 with the "m" outputs thereof connected to the voltage inputs of terminal exchange sets 53 of the first group. In this case each remote subscriber module 3 comprises remote supply voltage transducer 52 (FIG. 6) and telephone sets 4 comprise logic AND gates 29 (FIG. 3), thus allowing feeding of the supply voltage only to those telephone sets 4 which are active.

Through-switching module 1 shown in FIG. 7 is designed similar to the through-switching module of the known in the art digital telephone system and comprises "1" groups of "k" terminal exchange sets 64 for data interchange with subscriber concentration modules 2, the inputs/outputs whereof constitute the intermediate group inputs/outputs of through-switching module 1. These terminal exchange sets 64, via group switching stage 65, are connected to a plurality of terminal exchange sets 66, whose number is selected to be, e.g., "p" and the inputs/outputs whereof constitute the inputs/outputs of the digital telephone system. Through-switching module 1 further comprises multi-frequency signaling unit 67, common signaling channel 68, and line signaling unit 69, with the inputs/outputs of units 67, 68 and 69 connected to appropriate handshake signal inputs/outputs of group switching stage 65, and also comprises control device 70 with the control inputs/outputs thereof connected to the control inputs/outputs of common signaling unit 68, of line signaling unit 69, and of group switching stage 65 via control bus 70'.

Figure 8:
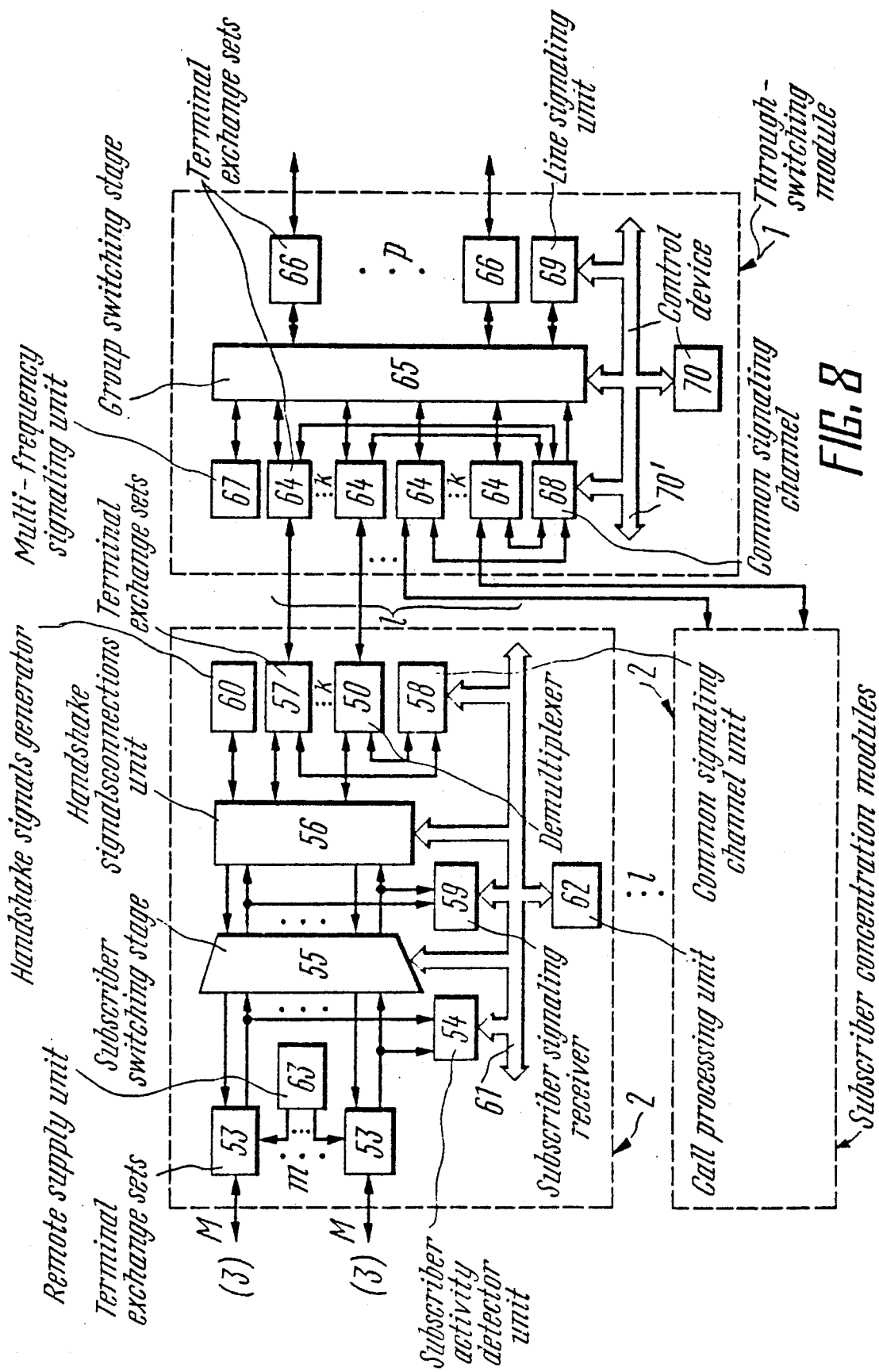
FIG. 8 shows a block structural diagram of an embodiment of the subscriber concentration module with the control signal arriving via terminal exchange sets.
Figure 9:
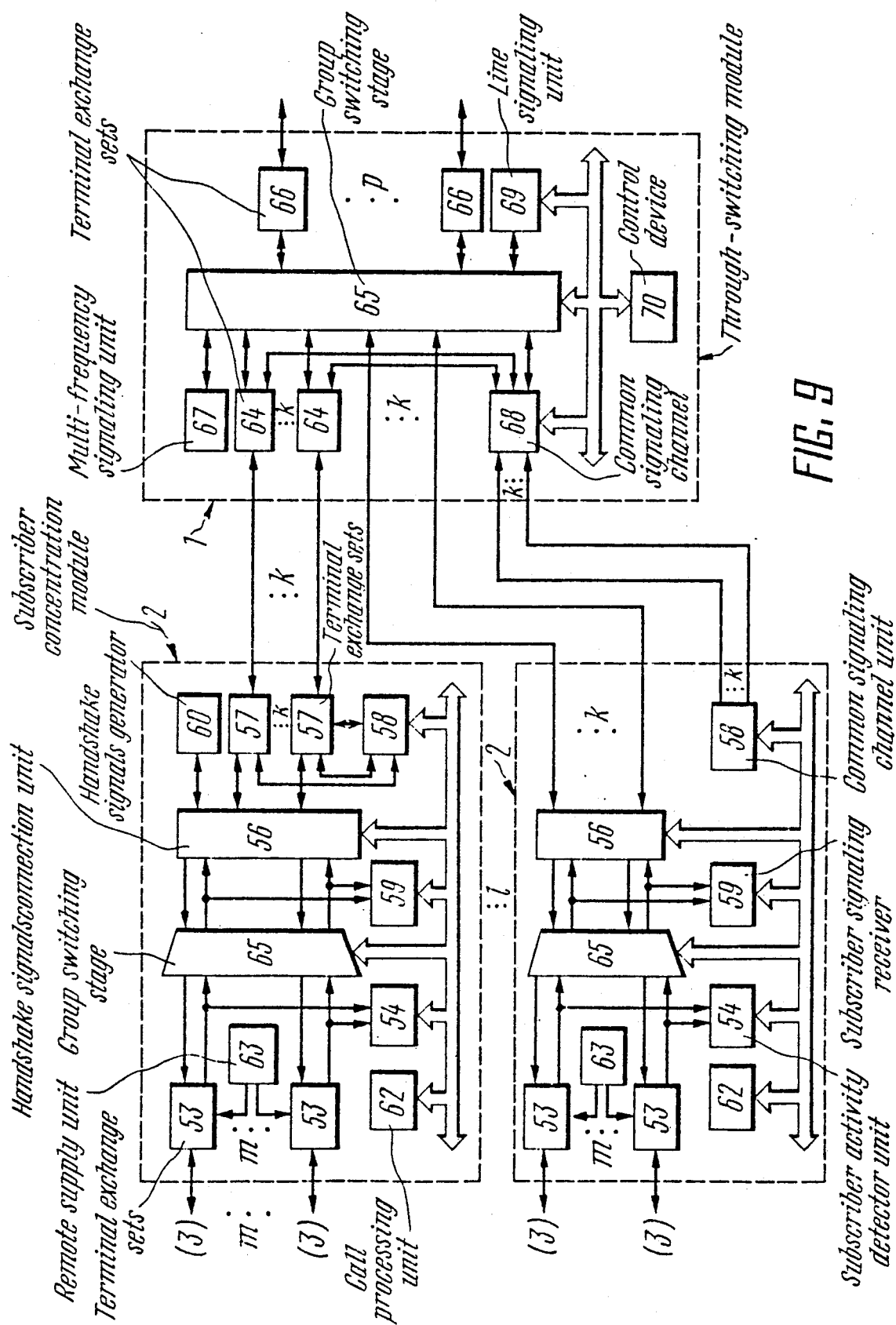
FIG. 9 shows a block diagram of an embodiment of the digital telephone system according to the invention, with two subscriber concentration modules connected to terminal exchange sets and to the common signaling channel unit of the through-switching module.

FIG. 8 shows another embodiment of subscriber concentration module 2 and through-switching module 1. In this embodiment common signaling channel unit 58 in subscriber concentration module 2 is equipped with signaling inputs/outputs connected to signaling inputs/outputs of each terminal exchange set 57 of the second group, and in through-switching module 1 common signaling channel unit 68 is complemented with signaling inputs/outputs connected to the signaling inputs/outputs of terminal exchange sets 64. This arrangement allowing shorter routing of control signals generated by common signaling channel unit 58 and therefore simplifying system control. Further refinement of the block diagrams of subscriber concentration module 2 and through-switching module 1 results in the circuit configuration presented in FIG. 9, wherein one subscriber concentration module 2 is designed as shown in FIG. 8 with "k" terminal exchange sets 57 connected to "k" terminal exchange sets 64 in through-switching module 1. The other subscriber concentration module 2 contains no terminal exchange sets 57 and handshake signals connection unit 56 is directly connected to the inputs/outputs of through-switching module 1, with the "k" individual inputs/outputs of common signaling channel units 58 and 68 in subscriber concentration module 2 and through-switching module 1, respectively, also directly interconnected. Such a design arrangement of subscriber concentration modules 2 and through-switching module 1 provides considerable savings of equipment used in the digital telephone system in cases when subscriber concentration modules 2 are positioned in the vicinity of through-switching module 1.

Figure 10:
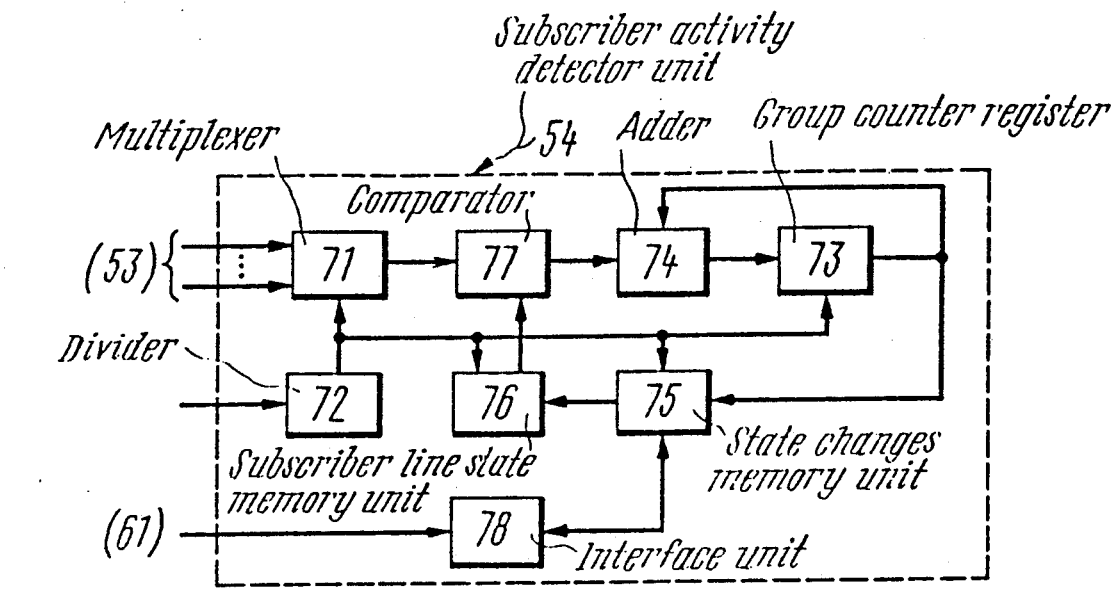
FIG. 10 shows a block diagram of an embodiment of the subscriber activity detector unit in the subscriber concentration module.

FIG. 10 shows the block diagram of an embodiment of subscriber activity detector unit 54. A multiplexer 71 has data inputs constituting the inputs of subscriber activity detector unit 54 and connected to terminal exchange sets 53 and the control input thereof is connected to the output of divider 72 and to the first input of group counter register 73. The second input and output of the group counter register 73 are connected, respectively, to the output and other input of adder 74 and to the input of state changes memory unit 75, whose output is connected to the input of subscriber line state memory unit 76.

The output of multiplexer 71 drives the first input of comparator 77, the second input whereof is connected to the output of line state memory unit 76 and the output whereof is connected to the second input of adder 74. The output of divider 72 is also connected to the second inputs of state changes memory unit 75 and of line state memory unit 76 and the third input of state changes memory unit 75 is connected via interface unit 78 to control bus 61 in subscriber concentration module 2.

Figure 11:
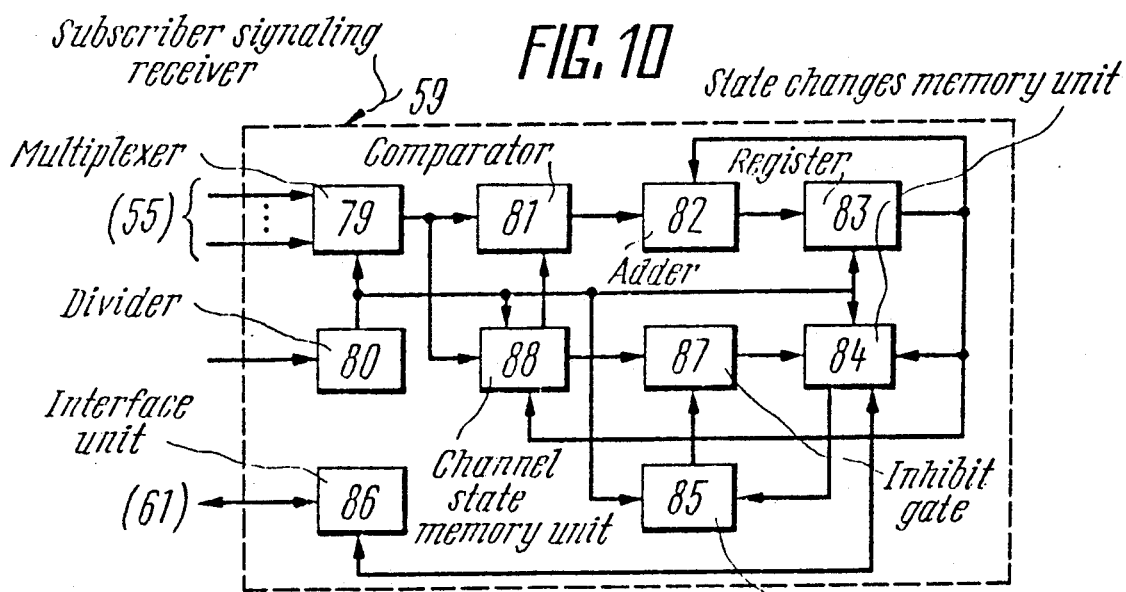
FIG. 11 shows a block diagram of an embodiment of the subscriber signaling receiver.

The block diagram of an embodiment of subscriber signaling receiver 59 shown in FIG. 11 is largely similar to the block diagram of subscriber activity detector unit 54 (FIG. 10). The subscriber signaling receiver (FIG. 11) also comprises multiplexer 79, divider 80, comparator 81, adder 82 being connected to the input of the register 83 to implement the functions of a group counter, state changes memory unit 84, register 85, interface unit 86 to the control channel, the design and interconnections whereof are similar to those of multiplexer 71, divider 72, comparator 77, adder 74, register 73, state changes memory unit 75 and interface unit 78 shown in FIG. 10. Subscriber signaling receiver 59 (FIG. 11) further comprises inhibit gate 87 with one input and output thereof connected, respectively, to the output of register 85 and the input of state changes memory unit 84, and also comprises channel state memory unit 88 with the inputs thereof connected to the output of divider 80 and to the outputs of multiplexer 79 to the output, of register 83 and of state changes memory unit 84. The outputs of channel state memory unit 88 are connected to the other input of inhibit gate 87 and to the other input of comparator 81.

As evident from FIG. 1, the digital telephone system of this invention comprises through-switching module 1, subscriber concentration modules 2, remote subscriber modules 3, and telephone sets 4. The telephone exchange building houses only through-switching module 1 and some of the subscriber concentration modules 2. In case of need, subscriber concentration modules 2 may be positioned remotely, at considerable distances from the automatic telephone exchange site, and installed in premises with guaranteed power supply. Telephone sets 4 are connected to subscriber concentration modules 2 only via remote subscriber modules 3 of low (less than 100 numbers) capacity connected to subscriber concentration modules 2 via four-wire group digital lines and installed in offices or in vestibules, i.e. in the direct vicinity of the telephone sets 4 to be serviced. The maximal length of individual subscriber lines does not exceed some 300 m to 500 m, thus providing considerable savings in cabling of the subscriber network and at the same time allowing passage of digital data streams at rates, corresponding to the clock frequency of analogue-to-digital conversion, directly to all subscribers. Using the same digital data streams of relatively high speed to transmit handshaking signals allows the transmit/receive facilities and handshake signal processing to be significantly simplified, with the overall effect of reduced dimensions, power consumption and costs.

The digital telephone system according to the invention is a synchronous one, with mutual synchronization of the functioning of subscriber concentration modules, through-switching module and remote subscriber modules, along with that of the other digital equipment used within the digital network, provided by the clock frequencies of digital data streams being transmitted. Interunit clock frequency circuitry, as well as the power supply circuitry, are omitted in FIGS. 1 to 10.

Figure 12:
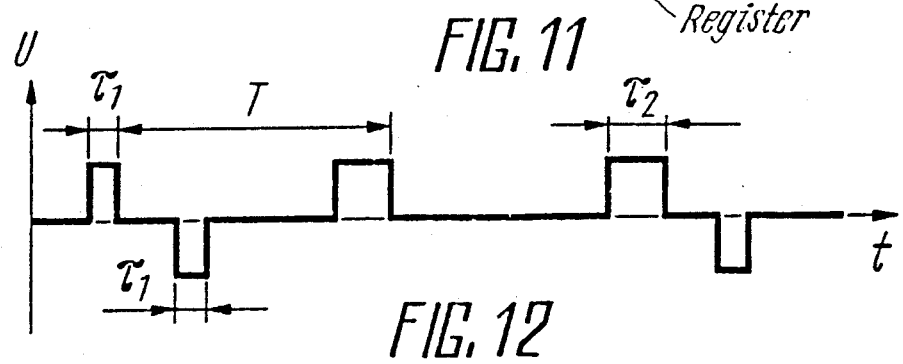
FIG. 12 shows a graph with the timing diagram of operation of the interface unit (shown in FIG. 4) in the telephone set.

As mentioned above, telephone ssts 4 are connected to remote subscriber modules 3 via digital subscriber lines, which are two-wire balanced transmission lines providing two-way transmission of digital signals and also transmission of the clock frequency and supply current to telephone sets 4. Shorter communication lines result in lower signal attenuation and delay, consequently allowing the use of simplest line codes, such as the unbalanced, low duty factor code shown in the timing diagram (FIG. 12). Pulses of positive polarity with durations $\tau_1=2$ μs and $\tau_2=4$ μs corresponding to logic zero and logic unity from pulse sequence generator 51 (FIG. 6) are passed via demultiplexer 50 and terminal exchange sets 44 to telephone sets 4 (FIG. 1). The time interval between the trailing (negative-going) edges of these pulses is the clock period of the subscriber line clock frequency (64 kHz with analogue-to-digital conversion by the pulse code modulation technique or 32 kHz with conversion using adaptive pulse code modulation or delta modulation). Transmission of digital signals to the remote subscriber module is acomplished using time sharing techniques with negative polarity pulses corresponding to logic units providing division.

Prior to describing the functioning of the digital telephone system according to the invention, distinctive features of individual units will be discussed.

The position in time of the signal to be transmitted is determined with a delay of some 2 μs to 3 μs relative to the trailing edge of the received pulse. This delay is provided by delay unit 33 (FIG. 4), with the timing pulse generated by positioner 34 in interface unit 11 in telephone set 4. Delay units 31, 33 and positioner unit 34 can be designed with integrating RC networks. The output pulses of positioner unit 34 gate the output signals from telephone set 4 at logic AND gate 35, the gated signals are then amplified by output amplifier 36 and passed to the transmission line.

When the handset rests on its hook, cradle switch 8 (FIG. 2) maintains test signal decoder 28 and call detector unit 18 in the enabled state; call detector unit may be implemented, e.g., as connected in series logic AND gate, power amplifier, and low-pass filter. The tone call signal generated in subscriber concentration module 2 (FIG. 1) in the form of packets of logic units and zeros with a repetition rate, e.g., 500 Hz, 700 Hz and 600 Hz is detected by interface unit 11 (FIG. 2), passed to call detector unit 18 and then reproduced by electroacoustic transducer 21. The test signal monitoring the operability of the subscriber line and telephone set in the form of a periodic combination of logic units and zeros, e.g. 10010, is detected by test signal decoder 28 but is not passed to electroacoustic transducer 21 due to call detector 18 being disabled by the signal from integrator 19, which locates no code combinations of the 11 or 101 kind in the received signal.

Figure 5:
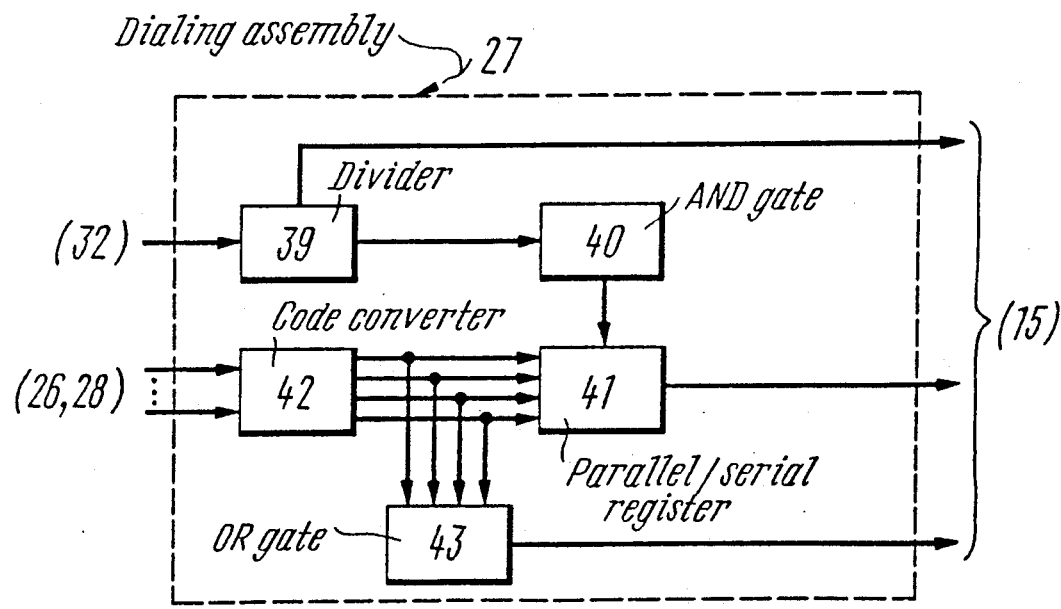
FIG. 5 shows a block diagram of an embodiment of the dialing assembly in the telephone set.

The required telephone number is dialled by the subscriber after lifting the handset, using keypad 26. The number is transmitted as a recurrent combination of the 1000 $X_1 X_2 X_3 X_4$ kind, wherein the first four bits constitute the synchronization signal, with the other characters representing the digit dialled in a binary code. These combinations are set up by dialling assembly 27, an embodiment whereof is shown in FIG. 5. Code converter 42 accomodates 12 or 16 keys of keypad 26 and generates a four-character word, corresponding to the key depressed, in parallel code, with depression of any key detected by logic OR gate 43. This word, along with the starting code combination, are entered in parallel format into register 41 on arrival of a pulse from logic AND gate 40 driven by the flip-flops in divider 39, wherein the signal is divided by a factor of 8, for subsequent serial readout and entry into multiplexer 16 (FIGS. 2, 3).

Multiplexer 16 is controlled by three signals: depression of a key of keypad 26, enabling of cradle switch 8, and the signal from integrator 19. In the absence of control signals there is no signal at the input of telephone set 4. Lifting the handset causes a tone combination 1010 from the first flip-flop in divider 39 (FIG. 5) of dialing assembly 27 to be passed to telephone set 4 output via multiplexer 16, and replaced by the code combination of the digit being dialled on depression of a key on keypad 26 (FIGS. 2,3) or by the signal from analogue-to-digital converter 13 if integrator 19 is enabled. On reception of the test signal, decoder 28 activates dialing assembly 27 as when a certain key is depressed, thus causing transmission of a corresponding combination used in subscriber concentration module 2 to monitor the fitness of subscriber equipment.

Telephone sets 4 are powered remotely, from remote subscriber modules 3 and subscriber concentration module 2, by a voltage from the primary winding of line transformer 37 (FIG. 4) in interface unit 11, regulated by voltage regulator 24 (FIGS. 2, 3). The major power consumers in telephone set 4 are the analogue-to-digital converter 13 and digital-to-analogue converter 22, powered via electronic key 25, which is enabled by a control signal from logic AND gate 29 only if the cradle switch 8 is closed and integrator 19 detects at least one 11 or 101 code combination in 150 to 250 characters received from the telephone exchange. Thus subscriber concentration module 2 (FIG. 1) is able to limit the supply current to the remote subscriber module in case a large number of telephone sets 4 are simultaneously enabled, by inhibiting power supply to the other telephone sets 4.

The speech signal from ADC 13 (FIGS. 2, 3) is scrambled in scrambler 14 prior to passage into the transmission line to exclude unauthorized tapping by receiving radio emissions from subscriber lines. Reverse processing of the received signal is provided by descrambler 20.

On replacement of the handset and after a time interval of 0.2 to 0.25 seconds (exceeding the reaction time of subscriber concentration module 2 to disable the signal to telephone set 4), the signal output of interface unit 11 (FIGS. 2, 3) is inhibited by univibrator 9, which is triggered by opening cradle switch 8. To provide reliable triggering it is preferable to equip cradle switch 8 with an antichatter network.

The somewhat complicated circuitry of digital telephone set 4 is due to part of the functions usually implemented by the equipment of an EPABX being transfered to the telephone set; however, these functions are reduced to simple operations handled by pulse technology, enabling most of the telephone set circuitry to be implemented with two relatively simple LSICs. The functions of remote subscriber module 3 interfacing unit 44 (FIG. 6) are signal transmission to and from individual digital transmission lines and are similar to those of interface units 11, while due to the low attenuation and delay in these lines, along with the use of group devices to generate pulses, their circuit arrangement is greatly simplified.

Remote subscriber module 3 communicates with subscriber concentration module 2 via a four-wire group line using receive/transmit regenerator 47 (FIG. 6). The group data stream with a bit rate of 2048Kbits per second is produced by integrating the digital streams from individual telephone sets 4 in multiplexer 45, while the group digital stream from subscriber module 2 is separated by demultiplexer 50. This is carried out without traffic concentration, with each individual data stream being assigned a constant clock position in the group stream frame. The cycle synchronization signal is inserted by group signal statistical processor 46, wherein the entire group stream, except the synchronization pulses, is processed statistically using either the known in the art technique (SU, A, 198389), or the even bit inversion circuit arrangement. Removal of this statistical processing in the received signal is provided by reverse statistical processor 49. Signals are integrated and divided and statistically processed with the aid of pulse sequences from pulse sequence generator 51. Cycle synchronization receiver 48 detects synchronization signals in the received group data stream and control the timing of pulse sequence generator 51, thus providing cycle synchronization of remote subscriber module 3 to the operation of subscriber concentration module 2.

Remote subscriber module 3 is powered remotely from subscriber concentration module 2. The supply voltage to remote subscriber module 3 and telephone sets 4 is generated by remote supply voltage transducer 52 driven by center taps on the primaries of the transmit and receive transformers (not shown in the drawings) of regenerator 47.

Subscriber concentration module 2 is interfaced to remote subscriber modules 3 and to through-switching module 1 by digital group transmission lines via terminal exchange sets 53 and 57 (FIG. 7), each comprising a receive/transmit regenerator, cycle synchronization transceiver and buffer memory for phase matching of the received group data stream to the frequency of the generating equipment in subscriber concentration module 2.

The digital subscriber data streams arriving at subscriber concentration module 2 via "m" group subscriber lines "M" are concentrated into "k" intermediate connection lines "K" to be driven by signals of only the active subscribers via subscriber switching stage 55. Digital switching is acomplished with the aid of spatial and time switching principles. With time switching, the subscriber signals are switched to other channels of the same trunk line, i.e. transferred to other clock positions of the same group data stream. The time switch comprises a data memory with separate write and read addressing and an address memory storing signals from call processor 62. The digital data streams are serially entered into the data memory, with each subscriber stream entered into an assigned to it memory space and subsequently read out by periodic signals from the address memory at time intervals corresponding to the clock positions of channels to which the subscriber's signal has to be transferred.

With spatial switching, the channels are transferred from one group line to another without changing their position in time, using electronic keys controlled by signals from the address memory.

Insertion of handshake signals from handshake signals generator 60 into signal channels is provided in handshake signal connection unit 56 which is a spatial and temperal switch connected in series, rather than in parallel, to the rest of the switches in subscriber switching stage 55 so as to provide access to the integrated subscriber signals in the connection lines. This necessitates handshake signals connection unit 56 to be complemented with electronic keys which, under command of signals from the address memory, connect the output signals of subscriber switching stage 55 directly to the output of handshake signals connection unit 56, and also allows pairs of transmission and reception channels to be looped, thus closing the telephone line inside subscriber concentration module 2.

Reception of handshake signals generated by telephone set 4 is provided by two group devices in subscriber concentration module 2, namely subscriber activity detector 54 which polls all subscriber channels at the input of subscriber switching stage 55, and subscriber signal receiver 59 which polls all channels at the output of this stage. An embodiment of subscriber activity detector 54 is shown in FIG. 10, a more detailed description of its functioning is presented herein. On arrival of a signal from divider 72, multiplexer 71 is connected in turn to one or several subscriber lines for an interval of 8 to 10 milliseconds and the information in each channel is processed during the corresponding clock period.

Subscriber activity detector 54 (FIG. 7) detects two states of a subscriber channel: active, if a 1010 signal is present, or passive, if there are no logic units. The states of all subscriber channels of subscriber concentration module 2 are stored in subscriber channel state memory 76 (FIG. 10) and thus the new state of a subscriber channel that has to be detected is known beforehand. Comparator 77 compared the arrived signal with the expected one and detects any mismatches, whose number during the checking interval is counted by a group counter comprising adder 74 and shift register 73, the latter storing the number of mismatch events for each subscriber position in the line being monitored. Register 73 is zeroed (reset) by a pulse from divider 72 at the start of a measurement interval, when multiplexer 71 connects a new line to subscriber activity detector 54. After this the content of register 73 is read out for each subscriber position and in case of a mismatch, adder 74 increments its readings and the new number is again entered into register 73. In case of a match or in case of filling, the contents of the counter remain unchanged. If by the end of the measurement interval (8 $\mu$s to 10 $\mu$s) the number of mismatches does not fill the counter, the state changes memory 75 stores a logic unity in its cell assigned to the given channel, thus meaning that a new value of the information signal has been defined for the given channel. Call processor unit 62 (FIG. 7) is notified about this via control channel interface 78 and control bus 61, after which a new value of the signal is entered into state memory 76 and a logic zero is entered into the memory cell corresponding to this given channel in state changes memory 75.

In this way subscriber activity detector 54 monitors all channels of the line under measurement during a single measurement interval. The simplicity of the signal to be detected (1010 or 0000) allows signal detection even in the presence of random lineouts by several dozen characters, thus allowing monitoring of several lines during a single measurement interval by connecting them in turn to comparator 77 via multiplexer 71. Subscriber activity of the other lines is monitored by the same subscriber activity detector 54 during subsequent measurement intervals, thus allowing periodic monitoring of all subscriber channels in subscriber concentration module 2 with a sampling period of not over some 80 $\mu$s to 100 $\mu$s.

Subscriber signaling receiver 59 is, as abovecited, designed along similar principles, but is designed to detect a greater number of signals, namely to detect all digits of the called subscriber number, to detect response to the test signal, and to detect subscriber passivity signals. All other signals are treated by signaling receiver 59 as a pause between the digits of the called subscriber telephone number and the subscriber activity signal. Therefore, the standard signal to comparator 81 is detected by signaling receiver 59 at the start of the measurement interval, when the received signal is entered into register 85, and lasts till comparator 84 and group counter (adder 82 and register 83) do not affirm errorless signal reception for several 8-bit words in a row. After this, the group counter counts the number of mismatches between the signal being received and the standard signal and, if the number is small enough, enters the new signal value ("digit code", "pause" or "passive") into state changes memory 84 if it differs from the previous state stored in state memory 88. Therefore a new value of the digit being dialled is transmitted via interface unit 82 to call processor 62 (FIG. 7) only if signaling receiver detects a pause after the preceeding digit.

Subscriber concentration module 2 operation is controlled by call processor 62, which is a microcomputer comprising a processor, working memory and interfaces for communication with the assemblies being controlled. The specific design of this microcomputer is not critical because the digital telephone system of this invention can be implemented both with the known in the art prototype controller, and with any other microcomputer of like speed and memory capacity. The software is determined by the command set, distribution of memory space and message formats, but the controller operation algorithm remains constant (to be disclosed below, in the description of the digital telephone system of the invention functioning), being determined by the general functions of an PABX. Handshaking signals interchange between through-switching module 1 and subscriber concentration modules 2 is via common signaling channel units 58 and 68, implementing the known in the art system arrangement. Handshake signals are inserted into group lines and transmitted at assigned positions in terminal exchange sets 57 and 66.

Remote power supply to remote subscriber modules 3 and telephone sets 4 is provided with the aid of complementary remote supply unit 63, with the input thereof connected to the primary supply system in subscriber concentration module 2 and with the outputs thereof connected to center taps on the primaries of terminal exchange sets 53, there latter being connected via four-wire transmission lines to corresponding remote subscriber modules 3.

Through-switching module 1 provides connection of subscriber channels of the digital telephone system according to this invention to other automatic and/or manual exchanges of any type in a telephone network or to other subscriber concentration modules 2 of the same EPABX. The major component of through-switching module 1 is the group switching stage, designed similar to the abovecited subscriber switching stage 55 in subscriber concentration module 2 and differing in a higher capacity and approximately equal number of input (interstational) and output (intrastational) communication lines. Due to this the switching field of group switching stage 65 may be of multiple links design.

Through-switching module 1 provides data interchange with other PABXs via terminal exchange sets 66 and signaling interchange—via common signaling channel unit 68. Handshake signals may be inserted into group data streams either using special input in terminal exchange sets, or via group switching stage 65. Communications with PABXs not equipped with terminal exchange sets are provided with the aid of multifrequency signaling units 67 and line signaling units 69, enabling, respectively, interchange via the data channel by transmitting two tone frequencies out of six frequencies available (using the two-out-of-six code), or via two signaling channels assigned within the sixteenth channel interval of the group data stream for each subscriber channel. Control of the operation of group switching stage 65 and all signaling (i.e. multifrequency signaling unit 67, line signaling unit 69 and common signaling channel unit 68) is provided by controller (marker) 70 which is similar in design to call processor 62 in subscriber concentration module 2 and operates according to the algorithm of operation of through-switching stages of known telephone systems.

The digital telephone system according to the invention, functions as follows.

The idle (passive) state of a subscriber channel is characterized by the absence of logic unities (FIG. 11) in both the forward and return subscriber lines. In such cases subscriber channel "M" is disconnected from the communication lines of subscriber switching stage 55 (FIGS. 7, 8) and this is stored in the working memory of call processing unit 62.

Lifting of the telephone handset trips cradle switch to allow passage of the 1010 code combination from divider 39 (FIG. 5) in dialing assembly 27 via multiplexer 16 (FIGS. 2,3) and interface unit 11 to the output of telephone set 4. This code combination arrives via subscriber line "N" (FIG. 7) at the input of multiplexer 45 (FIG. 6) of remote subscriber module 3 for insertion into the group data stream with the aid of multiplexer 45 and statistical signal processor 46 and is then passed by regenerator 47 via group subscriber line "M" (FIG. 7) to subscriber concentration module 2, wherein it is transmitted by terminal exchange sets 53 to subscriber activity detector 54. Detector 54 polls the received by terminal exchange sets 53 group data streams and thus detects the change in signal from telephone set 4 and notifies call processor 62 about this change, specifying the channel and line numbers which determine the number of the calling telephone set 4.

Call processor 62 functions in accordance to a program stored in its ROM and determines the number of an idle transmission line by the data contained in its working memory, then commands subscriber switching stage 55 to connect (through-switch) the idle transmission line to the subscriber channel which has become active. The same command is passed to subscriber signaling receiver 59, wherein control channel interface unit 86 (FIG. 11) passes the new signal value via connection line G to call processor 62, if receiver 59 detects a change in previous state. On reception from subscriber signaling receiver 59 of a message notifying the presence of logic units in this connection line (a "pause" signal) call processor 62 commands handshake signals connection unit 56 to enable connection of the "exchange ready" signal from the group stream of handshake signal generator 60 to the reverse channel of transmission line L, G. This signal arrives at remote subscriber module 3 via group subscriber line "M" and is passed via regenerator 47 and reverse statistical processor 49 to multiplexer 50, where it is extracted out of the group data stream and directed to the appropriate individual subscriber line and via the appropriate interface unit 44 arrives at the input of telephone set 4 (FIGS. 2, 3).

This signal is passed to integrator 19 in telephone set 4 by interface unit 11 to enable electronic key 25 via logic AND gate 29. Electronic key 25 passes the supply voltage from voltage regulator 24 to analogue-to-digital converter 13 and digital-to-analogue converter 22, making the "exchange ready" signal hearable in earphone 23, where it arrives by passing from the signaling output of interface unit 11 via descrambler 20 and digital-to-analogue converter 22.

Dialing the called subscriber's number by depressing keys on keypad 26 causes dialing assembly 27 to generate a periodically repeated code combination 1000 $X_1 X_2 X_3 X_4$. This combination is passed via multiplexer 16 and interface unit 11 to interface unit 44 (FIG. 6) in remote subscriber module 3, from the output whereof it is transmitted along the abovecited signal path to the output of remote subscriber module 3, and therefrom to subscriber concentration module 2, wherein, passing via an appropriate terminal exchange set 53 and subscriber switching stage 55, it arrives at the output of connection line G (as above-cited for the "active" signal). On detection of the first digit of the telephone number being dialled, call processor 62 enters it into the working memory and commands handshake connection unit 56 to enable the "exchange ready" signal. In a similar way the rest of the digits of the number being dialled arrive at call processor 62, wherein completion of dialing is determined by counting the number of digits received and the dialed number is analysed. If the called subscriber is not of the same subscriber concentration module 2, call processor 62 passes the dialed number via terminal exchange sets 57 (FIG. 7) and common signaling channel 1 unit 58 to an appropriate terminal exchange set 64 in through-switching module 1, wherefrom the number is passed to control device 70 along with data about the calling subscriber (i.e., his telephone number and priority rating).

Control device 70 (marker 70) uses the contents of its ROM to determine to what PABX the called subscriber belongs and with what signaling devices the called subscriber is equipped, detects an idle communication line to that PABX by the data in its working memory, and commands group switching stage 65 to connect this line to the calling subscriber channel. After this, all data about the connection being established is passed to this PABX via an appropriate signaling channel. If the called number belongs to a telephone set 4 of the same subscriber concentration module 2 as the calling number, or of the same EPABX, the connection is established using loop electric keys in handshake signals connection unit 56 (FIG. 7) on command from call processor 62, or via group switching stage 65 on command from control device 70. This operation is carried out following known in the art procedures.

After this the calling subscriber receives acoustic signals (e.g. "call monitored", "busy") and speech signals from the called subscriber PABX. On replacement of the handset on its cradle, cradle switch 8 (FIGS. 2,3) is tripped during 0.2 s to 0.25 s and the signal output of interface unit 11 is inhibited by univibrator 9, which is triggered by opened cradle switch 8. This causes a logic zero at the input of subscriber signaling receiver 59, arriving via interface unit 11, individual subscriber line, remote subscriber module 3 (FIG. 7), terminal exchange set 54 and subscriber switching stage 55. The absence of logic units (i.e. an all-zero signal) in the calling subscriber channel is detected by receiver 59 as a "passive" ("idle") signal.

On reception of this message, call processor 62 commands handshake signals connection unit 56 to send a "busy" signal to the called subscriber. Simultaneously, a calling subscriber ring-off signal is passed along the path: common signaling channel unit 58-terminal exchange set 57-terminal exchange set 64-control device 70, and then to the called subscriber PABX via an appropriate signaling channel via the "p" inputs/outputs). Call processor 62 in subscriber concentration module 2 and marker 11 in through-switching module 1 disconnect the subscriber channels and handshake signals from connection lines "P" via subscriber switching stage 55 and handshake signals connection unit 56, and via group switching stage 65, respectively, on arrival of ring-off signals from the calling and called subscribers.

With incoming communications, the signal arrives via terminal exchange set 66 and group switching stage 65 at control device 11.

On reception of data about the connection being established from an external PABX, control device 11 passes it via the terminal exchange set 64 channel to call processor 62 in subscriber concentration module 2 of the called number and commands group switching stage 65 in through-switching module 1 to connect the line on which the call has been received to an idle group connection line "K" of this subscriber concentration module 2. Call processor 62 commands subscriber switching stage 55 to connect this group communication line "K" to the called subscriber channel and also commands handshake signals connection unit 56 to insert a test signal into this channel from call signal generator 60. In case the called subscriber is busy, a "busy" signal is sent to through-switching module 1 and therefrom to the calling subscriber.

The test signal from handshake signal generator 60 arrives at remote subscriber module 3 via handshake signals connection unit 56, subscriber switching stage 54, and terminal exchange set 53. In remote subscriber module 3 the test signal is passed via regenerator 47, reverse statistical processor 49, demultiplexer 50, and interface unit 44 to interface unit 11 (FIGS. 2,3) in telephone set 4. Here the signal from the output of interface unit 11 arrives at decoder 28 and from the output thereof is passed to dialing assembly 27. In response to this signal dialing assembly sends an answering code combination corresponding to a specified digit. On reception of a message indicating that this digit has been detected by subscriber signaling receiver 59, call processor 62 considers the subscriber line to be intact and commands handshake signals connection unit 56 to send a tone call signal to telephone set 4 and a call transmission monitoring signal to through-switching module 1. The tone call signal passes within telephone set 4 along the same signal path as the test signal and is detected by integrator 19 (FIGS. 2,3), which enables its passage via call signal detector 18 to electroacoustic transducer 21, if cradle switch 8 is tripped.

Lifting the handset from the cradle causes logic units (tone code combination) to appear in divider 39 of dialing assembly 27 or causes a signal from analogue-to-digital converter 13 to appear in the subscriber channel from telephone set 4, and this is detected by subscriber signaling receiver 59 as a "pause" signal, sensed by call processor 62 as an answer to the call signal. At the same time, handshake signals connection unit 56 receives a command to disable transmission of tone call call transmission monitoring signals and establish a voice connection, maintained until the abovecited operations are carried out, on subscriber disconnection.

Thus, the digital telephone telecommunication system according to the invention, while performing all the usual functions of known in the art digital PABXs, provides considerable savings in subscriber network cabling by reducing the scope of necessary exchange equipment, by using group transmission systems for all subscriber communications. Furthermore, the functional capabilities of the system are widened by bringing digital data streams directly to all subscribers, this being accomplished by transferring digital-to-analogue conversion functions to telephone sets 4. The subscriber is thus able to receive and send information from and to a wide range of digital hardware, such as personal computers, telefax, teletext, etc. The use of these digital data streams allows implementation of highly efficient digital devices to transmit and receive handshake signals, this resulting in considerable simplification of remote subscriber modules and reduction of their dimensions and power consumption. This also allows remote power supply of these modules and their instalment in general-purpose rooms, and provides essential savings in hardware costs. Furthermore, the time of telephone number dialing is reduced and the interference immunity of its transmission is improved.

What is claimed is:

1. A digital telephone system for digitally coded information interchange, comprising:
   groups of digital telephone sets performing analogue-to-digital and digital-to-analogue conversion of transmitted and received information respectively;
   each of said telephone sets having an input/output to receive and transmit digitally coded information;
   remote subscriber modules, one per each of said groups of said telephone sets;
   said remote subscriber modules multiplexing signals arriving from said telephone sets of the digital telephone system;
   a digital individual subscriber line;
   each of said remote subscriber modules having individual inputs/outputs connected via said digital individual subscriber line to said inputs/outputs of all telephone sets of a corresponding group, and a group subscriber input/output;
   subscriber concentration modules to concentrate traffic from said telephone sets of the digital telephone system;
   each of said subscriber concentration modules having group subscriber inputs/outputs connected to said group subscriber input/output of respective remote subscriber modules, and having intermediate inputs/outputs;
   a through-switching module having one group of inputs/outputs constituting connection inputs/outputs of said digital telephone system and groups of intermediate inputs/outputs, the number of said groups being equal to that of said subscriber concentration modules;
   said intermediate inputs/outputs of each group of said through-switching module being connected to said intermediate inputs/outputs of corresponding subscriber concentration modules.

2. A digital telephone system as claimed in claim 1, wherein each of the said telephone sets comprises:
   a cradle switch to switch the telephone set to the information interchange mode, and having an output;
   a univibrator to generate a control signal on command from said cradle switch and having an input connected to said output of said cradle switch, and an output;
   an interface unit to interface said telephone set with said digital individual subscriber line and having a line input/output serving as the said input/output of said telephone set, a signaling input connected to said output of said univibrator, a data input, a supply voltage output, and a signaling output carrying an individual digital signal received by said telephone set;
   a voltage regulator to regulate the supply voltage and having an input connected to said supply voltage output of said interface unit, and an output;
   an electronic key having a control input electrically connected to said output of said cradle switch, an input connected to said output of said voltage regulator, and an output, and said electronic key being triggered by said cradle switch tripping;
   an integrator to detect the presence of a signal at the signaling output of said interface unit and having an input connected to said signaling output of said interface unit, and an output;
   a call signal detector to detect call signals in an information stream and having a first control input connected to said output of said cradle switch, a second control input connected to said output of said integrator, a data input connected to said signaling output of said interface unit, and an output;
   an electroacoustic transducer having an input connected to said output of said call signal detector and transducing digitally coded call signals into acoustic signals.
   a microphone having an output;
   an analogue-to-digital converter having a data input connected to the output of said microphone, a supply voltage input connected to said output of said electronic key, and an output, and converting analogue signals from said microphone into individual digital signals on applying a supply voltage on enabling said electronic key;
   a scrambler to perform statistical processing of individual digital signals and having an input connected to said output of said analogue-to-digital converter and an output;
   a dialing assembly with a keypad for dialing the telephone number of a called subscriber and having a data input and a control input and an output to generate signals corresponding to the digits of the number being dialed;
   a multiplexer to generate an output digital data stream of said telephone set and having a first data input connected to said output of said scrambler and a second data input connected to said output of said dialing assembly, a first control input connected to said output of said integrator, a second control input connected to said output of said cradle switch, and an output connected to said data input of said interface unit to transmit a generated output digital data stream;
   a descrambler having an input connected to the signaling output of said interface unit, and an output, and performing reverse statistical processing of the individual digital signal received by said telephone set;

a digital-to-analogue converter having a data input connected to said output of said descrambler, a supply voltage input connected to said output of said electronic key, and an output;

an earphone having an input connected to said output of said digital-to-analogue converter; and a test signal decoder to receive test signals in the individual digital signal and generate an answer in response to said test signals, and having a control input connected to said output of said cradle switch to control reception of said test signals, a data input connected to said signaling output of said interface unit, and an output connected to said control input of said dialing assembly.

3. A digital telephone system as claimed in claim 2, wherein each of said remote subscriber modules comprises:

interface units to interface the remote subscriber module with said digital individual subscriber line;

each of said interface units having an input/output constituting one of the said inputs/outputs of said remote subscriber module, a data input, and an output;

a multiplexer having data inputs connected to said output of each of said interface units to combine individual digital subscriber streams into a group subscriber signal for transmission as a digital stream, a control input and an output;

a statistical group signal processor to provide statistical processing of said group subscriber signal and to insert a cycle synchronization signal, and having a data input connected to said output of said multiplexer, a control input, and an output;

a regenerator to interface said remote subscriber module with a group subscriber line and having an input/output constituting said group subscriber input/output of said remote subscriber module, a data input connected to said output of said statistical group signal processor, and a data output;

a cycle synchronization signal receiver to synchronize the operation of demultiplexing the group subscriber signal received from another subscriber and having an input connected to said data output of said regenerator and an output;

a reverse statistical signal processor to provide reverse statistical processing of the group subscriber signal received from a respective subscriber concentration module, and having a data input connected to said output of said regenerator to receive said group subscriber signal, a control input, and an output;

a demultiplexer having a data input connected to said output of said reverse statistical signal processor, a control input and data outputs, one data output per each of said interface units, connected to said data input of a respective interface unit, and transmitting individual subscriber signals to said individual inputs/outputs of said remote subscriber module; and a pulse sequence generator having an input connected to said output of said cycle synchronization signal receiver, and outputs connected to said control inputs of said multiplexer, said statistical group signal processor, said demultiplexer, and said reverse statistical group signal processor to synchronize their operation.

4. A digital telephone system as claimed in claim 3, wherein each subscriber concentration module comprises:

a first group of terminal exchange sets, one terminal exchange set per each said individual input/output, to provide information interchange with said telephone sets of a corresponding group;

each of said terminal exchange sets having one input/output constituting said individual input/output of said subscriber concentration module and a data input and a data output;

a subscriber activity detector having data inputs, one data input per each of of said terminal exchange sets, connected to said data output of a respective terminal exchange set and a control input/output;

a subscriber switching state to switch subscriber channels and having a first group of data inputs and a first group of data outputs, each input and output thereof connected to an appropriate data output and data input, respectively, of said terminal exchange sets, a second group of intermediate inputs and second group of intermediate outs, and a control input/output;

a subscriber signaling receiver having data inputs, one date input per each of said intermediate outputs of said subscriber switching stage, connected to said intermediate outputs of said subscriber switching stage and a control input/output;

a handshake signals connection unit to insert handshake signals into the switched subscriber channels and having a group of intermediate inputs and group of intermediate outputs, with each input and output thereof connected, respectively, to an intermediate output and intermediate input of said subscriber switching stage, a group of data inputs/outputs, a handshake signal input, and two control inputs/outputs;

a second group of terminal exchange sets, one terminal exchange set per each of said groups of intermediate input/output of said subscriber concentration module, having one group of data inputs/outputs constituting said intermediate input/outputs, another group of data inputs/outputs connected each to an appropriate said data input/output of said handshake signals connection unit;

a common signaling channel unit electrically connected to said terminal exchange sets of the second group;

a control bus to provide interchange of control signals;

a call processor having an input/output connection via said control bus to said control input/output of said subscriber activity detector, said control input/output of said subscriber switching stage, said control input/output of said subscriber signaling receiver, said common signaling channel unit, and to the control inputs/outputs of said handshake signals connection unit;

a handshake signal generator having an output connected to said handshake signal input of said handshake signals connection unit.

5. A digital telephone signal as claimed in claim 4, wherein:

each of said subscriber concentration modules further comprises a said common signaling channel unit having group of control inputs/outputs, each of said terminal exchange sets of second group having a signaling input/output connected to said signaling inputs/outputs of said common signaling channel unit;

wherein each of said through-switching modules comprises;

"1" groups of terminal exchange sets, one terminal exchange set per each said subscriber concentration modules, with each terminal exchange set thereof having a first data input/output constituting the group intermediate input/output of said through-switching module, a second data input/output, and a control input/output;

a group switching stage having a first group of data inputs/outputs, one input/output per each of said terminal exchange sets, each said input/output connected to said second data input/output of said terminal exchange set of one of the "1" groups, a first, second and third handshake signal input/output, a second group of data inputs/outputs and control inputs/outputs;

a second group of terminal exchange sets, one terminal exchange set per each of said data inputs/outputs of said second group in said group switching stage, each of said terminal exchange sets having one data input/output connected to an appropriate said data input/output of the second group of said group switching stage, and a second data input/output constituting a corresponding said signaling input/output of said digital telephone system;

a multifrequency signaling unit having an input/output connected to said first handshake input/output of said group switching stage;

a common signaling channel unit have a group of control inputs/outputs connected to said control inputs/outputs of a respective terminal exchange sets of said "1" groups, a control signal input/output to control the group switching stage connected to said second handshake signal input/output of said group switching stage, and a control input/output;

a line signaling unit having an input/output connected to said third handshake signal input/output of said group switching stage and control inputs/outputs;

a control bus;

a control device having an input/output connected via said control bus to said control inputs/outputs of said line signaling unit, said group switching stage, and said common signaling channel unit.

6. A digital telephone system as claimed in claim 5, wherein
each subscriber concentration module further comprises
a remote power supply unit having one output per each of said terminal exchange sets of said first group, and
each of said terminal exchange sets of said first group having a voltage input connected to a corresponding output of said remote power supply unit;
each remote subscriber module further comprises
a remote supply voltage transducer to transform a remote supply voltage and having inputs connected to said input/output of said regenerator, and an output, and
each of said interface units having a voltage input connected to said output of said remote supply voltage transducer to feed the remote supply voltage to a respective telephone set;

each of said telephone sets further comprising a logic AND gate to enable a remote power supply and having one input connected to said output of said cradle switch, another input connected to said output of said integrator, and an output connected to said control input of said electronic key.

7. A digital telephone system as claimed in claim 2, wherein each subscriber concentration module comprises:
a first group of terminal exchange sets, one terminal exchange set per each said individual input/output, for information interchange with said telephone sets of a corresponding group;
each of said terminal exchange sets having one input/output serving as the said individual input/output of said subscriber concentration module, and a data input and a data output;
a subscriber activity detector having data inputs, one data input per each of said terminal exchange sets, connected to said data output of a respective terminal exchange set, and a control input/output;
a subscriber switching stage to switch subscriber channels and having a first group of data inputs and a first group of data outputs, with each data input and output thereof connected, respectively, to said data output and said data input of a respective terminal exchange set, a second group of intermediate inputs, a second group of intermediate outputs, and a control input/output;
a subscriber signaling receiver having data inputs, one data input per each of said intermediate outputs of said subscriber switching stage, connected to said intermediate outputs of the subscriber switching stage and a control input/output;
a handshake signals connection unit to insert handshake signals into switchable subscriber channels and having a group of intermediate inputs and a group of intermediate outputs, each input and output thereof connected, respectively, to intermediate inputs of said subscriber switching stage, a group of data inputs/outputs, a handshake signal input, and two control inputs/outputs;
a second group of terminal exchange sets, one terminal exchange set per each of said groups of intermediate input/output of said subscriber concentration module, having one group of data inputs/outputs constituting a group of intermediate inputs/outputs, and another group of data inputs/outputs, with each input/output thereof connected to an appropriate data input/output of said group of data inputs/outputs of said handshake signals connection unit;
a common signaling channel unit electrically connected to said terminal exchange sets of the second group;
a call processor having an input/output connected via a control bus to said control input/output of said subscriber activity detector, said control input/output of said subscriber switching stage, said control input/output of said subscriber signaling receiver, said common signaling channel unit, and to the control inputs/outputs of said handshake signals connection unit;
a handshake signal generator having an output connected to said handshake signal input of said handshake signals connection unit.

8. A digital telephone system as claimed in claim 7, wherein each of said subscriber concentration modules further comprises a common signaling channel unit having a group of inputs/outputs, each of said terminal exchange sets of the second group having a control input/output connected to said control outputs of said common signaling channel unit;

wherein each of said through switching modules comprises:

"1" groups of terminal exchange sets, one terminal exchange set per each of said subscriber concentration modules, each having a first data input/output constituting an intermediate group input/output of said through-switching module, a second data input/output, and a signaling input/output;

a group switching stage having a first group of data inputs/outputs, one input/output per each of said terminal exchange sets, each input/output connected to said second data input/output of said terminal exchange set of one of the "1" groups, a first, second and third handshake signal input/output, a second group of data inputs/outputs and control inputs/outputs;

a second group of terminal exchange sets, one terminal exchange set per each of said data inputs/outputs of the second group in said group switching stage, each of said terminal exchange sets of said second group having one data input/output connected to an appropriate data input/output of said second group of data inputs/outputs in said group switching stage and a second data input/output constituting a signaling input/output of said digital telephone system;

a multifrequency signaling unit having an input/output connected to said first handshake signal input/output of said group switching stage;

a common signaling channel unit having signaling inputs/outputs connected to said signaling input/input of a respective terminal exchange sets of said "1" groups, a handshake signal input/output connected to said second handshake signal input/output of said group switching stage, and a control input/output;

a line signaling unit having an input/output connected to said third handshake signal input/output of said group switching stage and control inputs/outputs;

a control bus;

a control device having an input/output connected via said control bus to said control inputs/outputs of said line signaling unit, said group switching stage, and said common signaling channel unit.

9. A digital telephone system as claimed in claim 8 wherein each subscriber concentration module further comprises a remote power supply unit having one output per each of said terminal exchange sets of the first group, and each of said terminal exchange sets of the first group having a voltage input connected to an appropriate output of said remote power supply unit;

each remote subscriber module, further comprises a remote supply voltage transducer to transform the remote supply voltage and having inputs connected to said input/output of said regenerator, and an output, and each of said interface units having a voltage input connected to said output of said remote supply voltage transducer to feed the remote supply voltage to a respective telephone set;

each of said telephone sets further comprises a logic AND gate to enable a remote power supply and having one input connected to said output of said cradle switch, another input connected to said output of said integrator, and an output connected to said control input of said electronic key.

* * * * *